(12) United States Patent
Kawasaki

(10) Patent No.: US 6,335,833 B1
(45) Date of Patent: Jan. 1, 2002

(54) AFOCAL ZOOM LENS SYSTEM FOR STREROSCOPIC MICROSCOPES

(75) Inventor: Kenji Kawasaki, Musashimurayama (JP)

(73) Assignee: Olympus Optical Co., Ltd., Tokyo (JP)

(*) Notice: Subject to any disclaimer, the term of this patent is extended or adjusted under 35 U.S.C. 154(b) by 0 days.

(21) Appl. No.: 09/691,040

(22) Filed: Oct. 19, 2000

Related U.S. Application Data

(62) Division of application No. 09/157,399, filed on Sep. 21, 1998, now Pat. No. 6,157,495.

(30) Foreign Application Priority Data

Sep. 22, 1997 (JP) .............................................. 9-123317

(51) Int. Cl.⁷ .............................................. G02B 15/14
(52) U.S. Cl. ....................................... 359/686; 359/677
(58) Field of Search ................................. 359/676, 686, 359/683, 684, 685, 677, 744

(56) References Cited

U.S. PATENT DOCUMENTS

| | | |
|---|---|---|
| 3,507,555 A | 4/1970 | Isshiki |
| 3,679,286 A | 7/1972 | Klein |
| 4,666,258 A | 5/1987 | Kimura |
| 4,820,028 A | * 4/1989 | Suda et al. .................. 359/686 |

FOREIGN PATENT DOCUMENTS

| | | | | |
|---|---|---|---|---|
| JP | 51-13663 | | 5/1976 | |
| JP | 53-9094 | | 4/1978 | |
| JP | 55-40849 | | 10/1980 | |
| JP | 55-41402 | | 10/1980 | |
| JP | 1-300214 | * | 12/1989 | .................. 359/686 |
| JP | 6-77104 | | 9/1994 | |

* cited by examiner

Primary Examiner—Huy Mai
(74) Attorney, Agent, or Firm—Pillsbury Winthrop LLP

(57) ABSTRACT

An afocal zoom lens system comprising a first positive lens unit, a second negative lens unit, a third positive lens unit and a fourth negative lens unit, wherein the first lens unit and the fourth lens unit are kept stationary, the second lens unit is moved so as to vary an airspace reserved between the first lens unit and the second lens unit, and an airspace reserved between the second lens unit and the third lens unit, the third lens unit is moved so as to vary an airspace reserved between the second lens unit and the third lens unit, and an airspace reserved between the second lens unit and the third lens unit, and an airspace reserved between the third lens unit and the fourth lens unit. The afocal zoom lens system for stereoscopic microscopes satisfies the following condition (1):

$$0.6 < f_3/f_1 < 0.7 \quad (1)$$

7 Claims, 11 Drawing Sheets

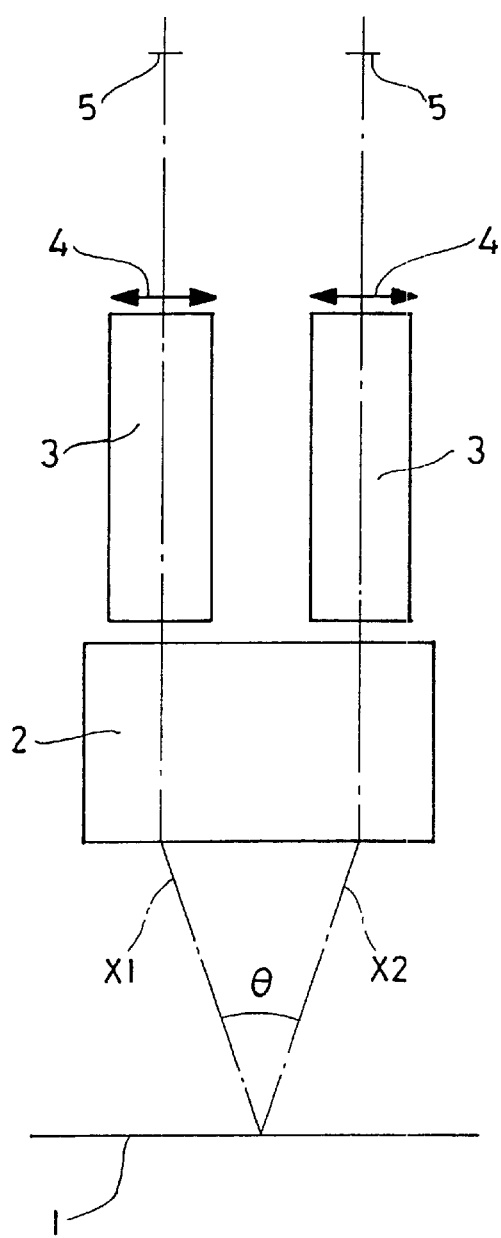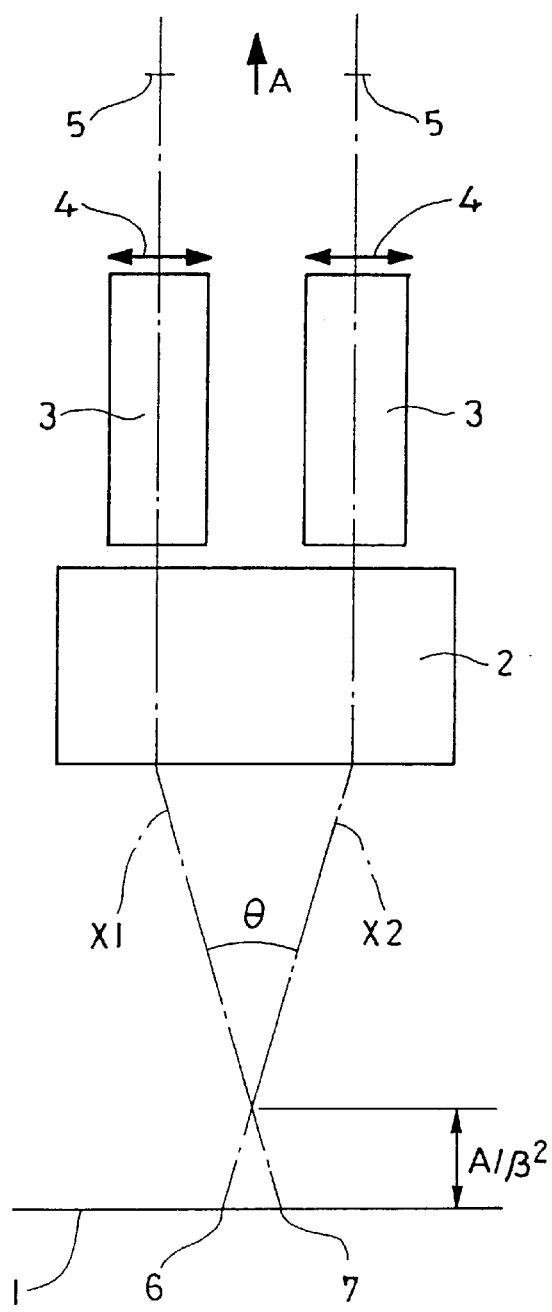

AFOCAL ZOOM LENS SYSTEM FOR STREROSCOPIC MICROSCOPES

This is a divisional of application Ser. No. 09/157,399, filed Sep. 21, 1998 now U.S. Pat. No. 6,157,495.

BACKGROUND OF THE INVENTION a) Field of the Invention

The present invention relates to a zoom lens system to be used in stereoscopic microscopes, and more specifically an afocal zoom lens system which has a high vari-focal ratio and favorable optical performance.

b) Description of the Related Art

A stereoscopic microscope is characterized in that it has a working distance which is much longer than that of an ordinary microscope and that it enables stereoscopic observation, whereby it is used for observing various specimens by utilizing these characteristic.

Currently, a stereoscopic microscope which has a high zoom ratio is required for stereoscopic observation. In other words, a stereoscopic microscope which has a high zoom ratio and excellent aberration correcting performance is effective for assembling parts of electronic circuits as well as shape observation and micrographic recording of these parts, and cell cultivation, egg selection and morphological observation in the biological field.

Stereoscopic microscopes are classified into Greenough type and Galilean type: the latter being suited for use as a stereoscopic microscope having a high zoom ratios. As shown in FIG. 1, a Galilean type stereoscopic microscope consists or, in order from a side of an object 1, an objective lens 2, afocal zoom lens systems 3, imaging lens systems 4 and eyepieces 6. As apparent from FIG. 1, optical systems on and after the afocal zoom lens systems are arranged in parallel with an optical axis of the objective lens 2 and eccentrically from the optical axis in the Galilean type stereoscopic microscope. Further, optical axes $X_1$ and $X_2$ of the afocal zoom lens systems 3 which correspond to left and right eyes extend toward the object so as to pass through the objective lens and are coincident with each other on a surface of the object 1. An angle θ formed between the two optical axis $X_1$ and $X_2$ corresponding to the left and right eyes is referred to as an internal inclination angle.

When zoom lens systems are configured as afocal zoom lens systems as in the stereoscopic microscope described above, it is possible to change a magnification through conversion of the objective lens, and to interpose a unit such as an illuminating optical system between the zoom lens systems and the imaging lens systems for coping with observation in various modes.

Further, the Greenough type stereoscopic microscope consists, in order from the object side, of objective lenses 2, zoom lens systems 3 and eyepieces 6 as shown in FIG. 2. Differently from zoom lens systems of the Galilean type stereoscopic microscope, the left and right zoom lens systems of the Greenough type stereoscopic microscope are disposed so as to have optical axes $X_1$ and $X_2$ which intersect at an angle. The Greenough type stereoscopic microscope is inferior from a viewpoint of systemization though the Greenough type has a merit that it can be manufactured at a lower cost and more compact than the Galilean type stereoscopic microscope.

As conventional zoom lens system for stereoscopic microscopes, there are known optical systems disclosed by Japanese Patents Kokoku Publication No. Sho 55-41402, Kokoku Publication No. Sho 55-40849, Kokoku Publication No. Sho 53-9094 and Kokoku Publication No. Sho 51-13663. However, these conventional examples have zoom ratios which are not sufficiently high.

Further, an optical system disclosed by Japanese Patent Kokoku Publication No. Hei 6-77104 is known as another conventional example. This conventional example uses afocal zoom lens systems having a zoom ratio of 8.5 which is higher than those of the other conventional examples mentioned above, but does not correct chromatic aberration sufficiently favorably at high magnifications and cannot satisfy current requirements for stereoscopic microscopes.

Furthermore, a perfocality deviation occurs when a temperature changes in an environment of a stereoscopic microscope. In such a case, this deviation is compensated by changing a working distance between an objective lens and an object. FIG. 3A shows a conceptional diagram of a stereoscopic microscope which is set at ordinary temperature and FIG. 3B shows a conceptional diagram of a stereoscopic microscope which is set at an elevated temperature.

In the stereoscopic microscope set at ordinary temperature shown in FIG. 3A, optical axes $X_1$ and $X_2$ for left and right eyes pass through an objective lens 2 and coincide with each other on an object surface 1. When the temperature changes and a working distance is changed to compensate for a perfocality deviation as shown in FIG. 3B, however, centers of optical axes for the left and right eyes are located at 6 and 7 on the object surface in FIG. 3B, thereby being not coincident with each other on the object surface. Accordingly, left and right images to be observed are shifted in directions toward the afocal zoom lens systems which are eccentric from an optical axis of the objective lens. When it is desired to observe a stereoscopic image of an object which has a fine structure, it is difficult to form a stereoscopic image by fusing the left and right images which are shifted leftward and rightward as described above. Not only the Galilean type stereoscopic microscope but also the Greenough type stereoscopic microscope has such a defect.

When a stereoscopic microscope is used in an environment which is the same as that selected for its assembly and adjustment, it is free from the problem of the perfocality deviation caused by the environmental change described above. The perfocality deviation due to a temperature change is caused by a refractive index change and linear expansion of a glass material as well as deformation of a lens barrel. Further, this phenomenon occurs also in cameras and there have been proposed various means to suppress perfocality deviations due to temperature changes. In case of a camera lens system which is free from the phenomenon to shift a center of an image, it is sufficient to simply move a lens unit adopted for compensating a perfocality deviation or another means so that an object and an image surface are conjugate with each other. Furthermore, an ordinary microscope which is also free from the phenomenon to shift a center of an image is capable of compensating a perfocality deviation by changing a working distance between a specimen and an objective lens.

The shifts of images to be observed by the left and right eyes which are caused by an environmental temperature change is therefore a phenomenon peculiar to an eccentric optical system of a stereoscopic microscope. An optical system of a stereoscopic microscope which allows images to shift for a long distance has a defect that it makes a stereoscopic microscope incapable of producing stereoscopic image of a fine structure.

In an optical system of a stereoscopic microscope, afocal zoom lens systems are affected most by the perfocality deviation due to a temperature change and the perfocality deviation is more remarkable as the lens systems have a higher magnification. Speaking concretely, a dynamic environmental change at a higher magnification produces a perfocality deviation in a larger amount, and centers of the optical axes for the left and right eyes are shifted for a longer distance in proportion to the perfocality deviation amount, thereby making the lens systems unsuited for stereoscopic observation at the high magnification.

At a high zoom magnification, even a temperature change of ±20° C. from 20° C. causes shifts of images to be observed by the left and right eyes due to perfocality deviation, thereby making the lens systems unsuited to observation of cells and eggs cultivated in a thermostatic chamber kept, for example, in an environment at approximately 40° C. and observation at an atmospheric temperature of approximately 40° C. or below ice point.

Refractive indices of glass materials are changed variously even by the same temperature change. Glass materials which have extraordinary dispersive properties capable of favorably correcting chromatic aberration have temperature coefficients larger than those of the ordinary glass materials. For example, S-FPL51 which is prepared by Ohara Co., Lti. has a temperature coefficient of negative sign. Accordingly, a lens system which uses a glass material having al extraordinary dispersive properity allows a perfocality deviation in an amount larger than that of a perfocality deviation allowed by an ordinary glass material. Therefore, an afocal zoom lens system which favorably corrects chromatic aberration, secondary spectrum in particular, can compose a lens system for microscopes which has a high zoom ratio and favorably corrects chromatic aberration. Such a lens system for microscopes pcses a problem that it allows remarkable perfocality deviation to be caused by a temperature change which is a dynamic environmental change, whereby the shifts of images to be observed by the left and right eyes described above makes the zoom lens system for microscopes unsuited for stereoscopic observation of fine structures. That is to say, it is impossible to make static performance such as a high zoom ratio and favorable aberration correcting capability with dynamic performance against the dynamic environmental temperature changes.

SUMMARY OF THE INVENTION

A primary object of the present invention is to provide Ea afocal zoom lens system for stereoscopic microscopes which has a high zoom ratio and corrects aberrations favorably over an entire zoom range. In particular, it corrects chromatic aberration at high magnifications. Another object of the present invention is to provide an afocal zoom lens system for stereoscopic microscopes which is free from perfocality deviations regardless of dynamic environmental temperature changes and reduces a shift of an image to be observed by a left or right eye, thereby allowing stereoscopic images of fine structures to be observed regardless of the environmental changes.

The afocal zoom lens system for stereoscopic microscopes according to the present invention is characterized in that it consists, in order from the object side, of a first lens unit having a positive refractive power, a second lens unit having a negative refractive power, a third lens unit having a positive refractive power and a fourth lens unit having a negative refractive power: the first lens unit and the fourth lens unit being kept stationary, the second lens unit being moved so as to vary an airspace reserved between the first lens unit and the second lens unit as well as an airspace reserved between the second lens unit and the third lens unit, and the third lens unit being moved so as to vary an airspace reserved between the second lens unit and the third lens unit as well as an airspace reserved between the third lens unit and the fourth lens unit; and that it satisfies the following condition (1):

$$0.6 < f_3/f_1 < 0.7 \tag{1}$$

Further, the afocal zoom lens system for stereoscopic microscopes according to the present invention having another composition is characterized in that it consists of a first lens unit which comprises three or more lens elements including a cemented lens component and a single lens element and has a positive refractive power, and at least three lens units which have a vari-focal function and a perfocal function; and that it is configured so that a perfocality deviation amount produced by at least one lens unit due to an environmental temperature is reduced by a perfocality deviation amount produced by another lens unit.

BRIEF DESCRIPTION OF THE DRAWINGS

FIGS. 3A and 3B show sectional views illustrating a perfocality deviation in a stereoscopic microscope caused due to a temperature change;

DETAILED DESCRIPTION OF THE PREFERRED EMBODIMENTS

Figure 5A:
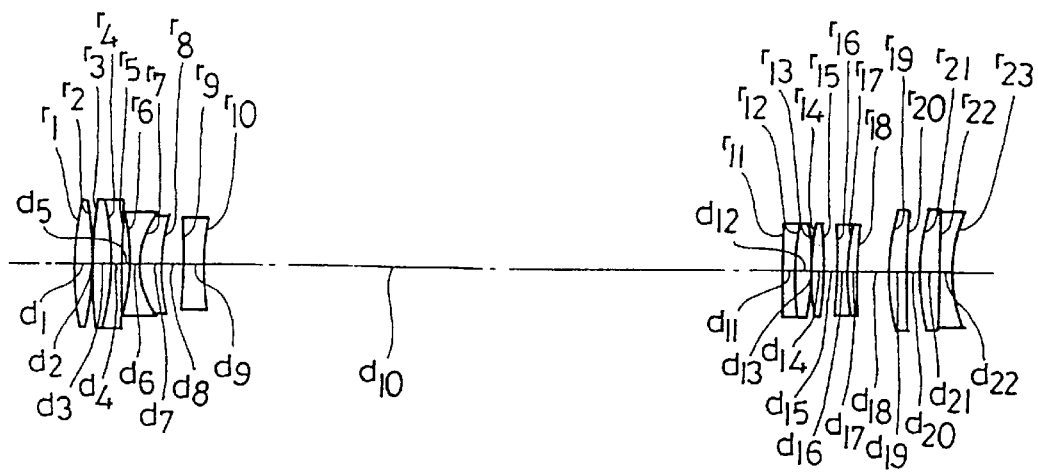
FIGS. 5(A–C) through 11(A–C) show sectional views illustrating compositions of first through seventh embodiments of the present invention.
Figure 5B:
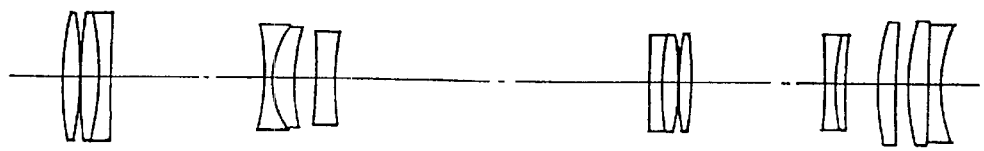
Figure 5C:
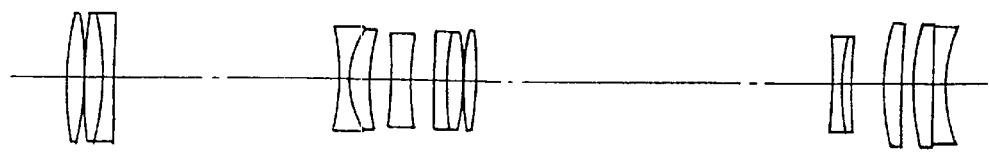

The afocal zoom lens system for stereoscopic microscopes according to the present invention has a composition shown in FIGS. 5(A–C), for example, or comprises, in order from the object side, of a first lens unit having a positive refractive power, a second lens unit having a negative refractive power, a third lens unit having a positive refractive power and a fourth lens unit having a negative refractive power, the first lens unit and the fourth lens unit being kept stationary, the second lens unit being moved so as to vary an airspace reserved between the first lens unit and the second lens unit as well as an airspace reserved between the second lens unit and the third lens unit respectively, and the third lens unit being moved so as to vary the airspace reserved between the second lens unit and the third lens unit as well as an airspace reserved between the third lens unit and the fourth lens unit; and that it satisfies the following condition (1):

$$0.6 < f_3/f_1 < 0.7 \tag{1}$$

wherein the reference symbols $f_1$ and $f_3$ represent focal lengths of the first lens unit and the third lens unit respectively.

By setting a ratio of the focal length of the third lens unit relative to the focal length of the first lens unit within a range defined by the condition (1), it is possible to obtain a high zoom ratio, a composition which can favorably correct aberrations within a broad magnification range and airspaces which allow no interference between the lens units at low magnifications and high magnifications.

If $f_3/f_1$ has a value which is smaller than the lower limit of 0.6 of the condition (1), the second lens unit and the third lens unit will interfere with each other at high magnifications, and the third lens unit and the fourth lens unit will interfere with each other at low magnifications, thereby making it impossible to obtain a high zoom ratio. Accordingly, powers of the second lens unit and the fourth lens unit must be strengthened, whereby aberrations will vary remarkably in an entire zoom range and can hardly be corrected.

If $f_3/f_1$ exceeds the upper limit of 0.7 of the condition (1), the third lens unit will hardly interfere with the second lens unit and the fourth lens unit, thereby making it possible to enhance a zoom ratio. However, the third lens unit will have a weak power and must be moved for a long distance to maintain the high zoom ratio and has a long total length, whereby aberrations will vary remarkably and an amount of rays will tend to be insufficient at low magnifications.

It is desirable to determine a fundamental composition of the afocal lens system by setting the ratio of the focal length of the third lens unit relative to the focal length of the first lens unit so as to satisfy the condition (1) and set a ratio of the focal length of the first lens unit relative to a focal length of the second lens unit so as to satisfy the following condition (2):

$$-0.35 < f_2/f_1 < -0.25 \qquad (2)$$

wherein the reference symbol $f_2$ represents a focal length of the second lens unit.

If $f_2/f_1$ exceeds the lower limit of −0.35 of the condition (2), the first lens unit and the second lens unit will interfere with each other at low magnifications, thereby making it difficult to obtain the low magnifications. Accordingly, the afocal zoom lens system must be shifted toward the high magnifications to maintain the high zoom ratio, thereby resulting in interference between the second lens unit and the third lens unit. In order to avoid this interference, the third lens unit must have a weakened power and be moved for a longer distance, thereby increasing variation of aberrations. Further, a total length of the zoom lens system is prolonged, whereby an amount of rays will tend to be insufficient at low magnifications.

If $f_2/f_1$ exceeds the upper limit of −0.25 of the condition (2), in contrast, the first lens unit, the second lens unit and the third lens unit will hardly interfere with one another, thereby making it possible to enhance a zoom ratio. However, the second lens unit will have a strengthened power and produce remarkable aberrations, thereby making it difficult to correct aberrations over the entire zoom range.

Furthermore, it is desirable that the fourth lens unit of the zoom lens system according to the present invention satisfies the following condition (3):

$$-1.1 < f_4/f_1 < -0.9 \qquad (3)$$

wherein the reference symbol $f_4$ represents a focal length of the fourth lens unit.

If $f_4/f_1$ exceeds the lower limit of −1.1 of the condition (3), the third lens unit and the fourth lens unit will tend to interfere with each other at low magnifications, thereby making it impossible to obtain a high zoom ratio. In order to avoid this interference, the third lens unit must have a weakened power and be moved for a longer distance, thereby making variations of aberrations more remarkable. Further, the zoom lens system will have a prolonged total length, thereby making an amount of rays insufficient at low magnifications. If $f_4/f_1$ exceeds the upper limit of −0.9 of the condition (3), in contrast, the third lens unit and the fourth lens unit will not interfere with each other, thereby making it possible to obtain a high zoom ratio. However, the fourth lens unit-will have a strengthened power, whereby aberrations may be aggravated over the entire zoom range.

The afocal zoom lens system according to the present invention which is characterized in that it has the composition described above and that it satisfies the condition (1) can be a more favorable lens system when it is configured to satisfy either of the conditions (2) and (3) or both of the conditions (2) and (3).

For the zoom lens system which has either of the compositions described above, it is desirable that the first lens unit has a composition comprising at least one cemented lens component consisting of a positive lens element and a negative lens element, the second lens unit has a composition comprising at least one negative cemented lens component consisting of a positive lens element and a negative lens element, the third lens unit has a composition comprising at least one cemented lens component consisting of a positive lens element and a negative lens element, and the fourth lens unit has a composition comprising at least one negative cemented lens component consisting of a positive lens element and a negative lens element.

It is desirable that the first lens unit has the composition which comprises a cemented lens component as descried above. Further, it is more desirable that the cemented lens component of the first lens unit satisfies the following condition (4):

$$15 < v_{1p} - v_{1n} \qquad (4)$$

wherein the reference symbol $v_{1p}$ represents an Abbe's number of a positive lens element of the cemented lens component to be used in the first lens unit and the reference symbol $v_{1n}$ designates an Abbe's number of a negative lens element of the cemented lens component to be used in the first lens unit.

It is possible to correct chromatic aberration favorably over the entire zoom range by configuring the first lens unit so as to have a composition which comprises a cemented lens component as described above. When an Abbe's number of the cemented lens component used in the first lens unit is selected within a range defined by the condition (4) mentioned above, it is possible to correct aberrations favorably in a broad magnification range from a low magnification to a high magnification, thereby obtaining images to be observed with high contrast.

If the lower limit of 15 of the condition (4) is exceeded, longitudinal chromatic aberration and spherical aberration of color will be aggravated at high magnifications in particular. If an attempt is made to correct these aberrations with Abbe's numbers of the other lens units, chromatic aberration will undesirably be aggravated at low magnifications. If an attempt is made to correct the aberrations mentioned above with bending of the cemented lens component of the first lens unit, spherical aberration of color will undesirably be aggravated at high magnifications though paraxial chromatic aberration can be corrected.

Furthermore, it is preferable to dispose a negative cemented lens component in the second lens unit so as to correct chromatic aberration favorably. It is more desirable that this cemented lens component satisfies the following condition (5):

$$15 < \nu_{2n} - \nu_{2p} \qquad (5)$$

wherein the reference symbol $\nu_{2p}$ and $\nu_{2n}$ represent Abbe's numbers of the positive lens element and the negative lens element respectively of the cemented lens component used in the second lens unit.

If the lower limit of 15 of the condition (5) is exceeded, longitudinal chromatic aberration will be aggravated within a magnification range from a high magnification to a vicinity of an intermediate magnification. If an attempt is made to correct this aberration with Abbe's numbers of the other lens units, lateral chromatic aberration will undesirably be aggravated within a zoom range from the vicinity of the intermediate magnification to a low magnification. If an attempt is made to correct this aberration with a bending of a lens, chromatic aberration will undesirably be aggravated at high magnifications and low magnifications.

Furthermore, it is desirable for favorable correction of chromatic aberration to dispose a cemented lens component in the third lens unit. It is more desirable that this the cemented lens component satisfies the following condition (6):

$$15 < \nu_{3p} - \nu_{3n} \qquad (6)$$

wherein the reference symbols V3p and V3n represent Abbe's numbers of the positive lens element and the negative lens element of the cemented lens component disposed in the third lens unit.

If the lower limit of 15 of the condition (6) is exceeded, longitudinal chromatic aberration will be aggravated over the entire zoom range. If an attempt is made to correct this aberration with Abbe's numbers of the other lens units, lateral chromatic aberration will be aggravated within a zoom range from a vicinity of an intermediate magnification to a high magnification, and spherical aberration and astigmatism will be aggravated at low magnifications. If an attempt is made to correct these aberrations with a bending of a lens, chromatic aberration will be aggravated at high magnifications and low magnifications, thereby making it impossible to correct aberrations favorably over the entire zoom range.

Moreover, it is desirable for favorable correction of chromatic aberration to dispose a negative cemented lens component in the fourth lens unit. It is more desirable that this cemented lens component satisfies the following condition (7):

$$10 < \nu_{4n} - \nu_{4p} \qquad (7)$$

wherein the reference symbols $\nu_{4p}$ and $\nu_{4n}$ represent Abbe's numbers of the positive lens element and the negative lens element respectively of the cemented lens component disposed in the fourth lens unit.

If the lower limit of 10 of the condition (7) is exceeded, chromatic aberration will be aggravated over the entire zoom range. If an attempt is made to correct this aberration with a bending of a lens, chromatic aberration will be aggravated at high magnifications.

The zoom lens system according to the present invention which comprises a cemented lens component in each of the lens units as described above is capable of correcting aberrations favorably in these lens units. Further, it is more desirable for correction of aberrations that these cemented lens components satisfy the above-mentioned conditions (4) through (7). Even when a cemented lens component is used in one of the four lens units, it is possible to correct aberrations favorably in the lens unit. This cemented lens component is capable of correcting aberrations favorably also in the zoom lens system. Furthermore, it is more effective to use cemented lens components in any two or any three lens units and most preferable to dispose cemented lens components in all the lens units.

In such a case, it is preferable that the cemented lens components satisfy any of the conditions (4) through (7).

For an afocal lens system for stereoscopic microscopes, it is important, to suppress the perfocality deviation as well as the shift of an image to be observed by a left or right eye due to an environmental temperature change which is a dynamic performance change. The afocal zoom lens system according to the present invention which has a second composition configured taking this point into consideration will be described below.

This afocal zoom lens system is characterized in: that it consists of a first lens unit which comprises three or more lens elements including a cemented lens component and a single lens element and has a positive refractive power, and three or more lens units which are disposed after the first lens unit, and have a vari-focal function and a perfocal function; and that it is configured so that a perfocality deviation amount produced by at least one of the lens units due to an environmental temperature change reduces a perfocality deviation amount produced by another lens unit.

In addition, it is desirable to compose the afocal zoom lens system which has the second composition so that a perfocality deviation amount produced by a second lens unit due to an environmental change reduces a perfocality deviation amount produced by the first lens unit.

Now, description will be made of a perfocality deviation and a shift of an image to be observed by a left or right eye which are caused as dynamic performance changes due to an environmental temperature change.

When an allowable shift of an image to be observed by a left or right eye is represented by $\delta$max, an internal inclination angle of an objective lens of a stereoscopic microscope is designated by $\theta$, a magnification of a lens system composed of an object, an objective lens, an afocal zoom lens system, an imaging lens system and an intermediate image is denoted by $\beta$ and a perfocality deviation amount produced by a temperature change is represented by A in such an optical system as that shown in FIGS. 3A and 3B (FIG. 3A showing the optical system at normal temperature and FIG. 3B showing the optical system at a temperature different from normal temperature), a change of a working distance between the object and the objective lens which is caused by the temperature change is expressed as $A/\beta^2$. Since the optical axis of the zoom lens system for the left or right eyes of the stereoscopic microscope is inclined at the internal inclination angle $\theta$ relative to a surface of the object, a center position 6 of the optical axis for the right eye or a center position 7 of the optical axis for the left eye are deviated as shown in FIG. 3B, whereby a shift of the center positions of the optical axes is expressed as $A/\beta^2 \sin(\theta/2)$.

That is, relationship between a shift amount $\beta$ of the optical axis of the zoom lens system for the left or right eye and a perfocality deviation amount A at a location of the intermediate image is as expressed below:

$$\delta = 2 \times \beta \times A/\beta^2 \times \sin(\theta/2)$$

When the allowable shift amount is represented by $\delta$max, an allowable perfocality deviation amount A1 is therefore expressed by the following formula (a):

$$A1 = \delta\text{max} \times \beta/(2 \times \sin(\theta/2)) \qquad (a)$$

Assuming $\beta=9$, $\theta=13°$ and $\delta max=0.08$ mm, for example, the formula (a) gives the allowable perfocality deviation amount A1 as A1=3.18 mm.

A perfocality deviation within 3.18 mm is allowable for observation through a stereoscopic microscope in a thermostatic chamber kept at 40° C. which is changed to +20° C. from 20° C. at an assembly-adjustment stage.

When an amount of slight change in a refractive index of an i'th lens component of the afocal zoom lens system is represented by $\Delta n_i$ and a perfocality correcting coefficient which represents a perfocality deviation amount corresponding to the change in the refractive index is designated by $\epsilon_i$, a perfocality deviation amount $A_i$ of the i'th lens component is expressed by the following formula (b):

$$A_i = \epsilon_i \times \Delta n_i \quad (b)$$

Accordingly, a perfocality deviation amount $\Sigma A_i$ to be produced by all the lens components (i=1, 2, ... K) of the afocal zoom lens system is expressed by the following formula (c):

$$\sum A_i = \sum_{i=1}^{k} \varepsilon_i \times \Delta n_i \quad (c)$$

From $(dn/dt)_i$ which is a temperature coefficient of a relative refractive index relative to temperature and a temperature change $\Delta t_i$, the amount $\Delta n_i$ of the slight change in the refractive index $n_i$ of the i'th lens component at a temperature $t_i$ is expressed by the following formula (d):

$$\Delta n_i = \Delta t \times (dn/dt) \quad (d)$$

Accordingly, a perfocality deviation amount is expressed by the following formula (e):

$$A = \sum_{i=1}^{k} \varepsilon_i \times \Delta t \times (dn/dt)_i \quad (e)$$

The correcting coefficient $\epsilon_i$ generally has a negative value for a positive lens and a positive value for a negative lens. From the relationship of perfocality deviation relative to the allowable shift amount $\delta max$ of the image to be observed by the left or right eye given by the formula (a), and the relationship of the perfocality deviation amount A relative to the temperature change $\Delta t$ given by the formula (e), it is therefore possible to suppress a shift of the image to be observed by the left or right eye which is to be caused by the environmental temperature change $\Delta t$ within the allowable range when the following condition (8) is satisfied:

$$(\delta max \times \beta)/\{2 \sin(\theta/2)\} > \Sigma \epsilon_i \times \Delta t \times (dn/dt)_i \quad (8)$$

In order to improve performance of the afocal zoom lens system by enhancing a zoom ratio and favorably correcting chromatic aberration, on the other hand, it is effective to use an extraordinarily dispersive glass material. However, a temperature coefficient of an extraordinarily dispersive glass material has a value which is negative to that of an ordinary glass material or large in absolute terms. Moreover, lens systems which use extraordinarily dispersive glass materials have large correcting coefficients $\epsilon_i$ and do not satisfy the condition (8) in most cases.

In order to satisfy the condition (8) and improve performance to correct aberrations at high magnifications, the afocal zoom lens system according to the present invention is composed of the first lens unit which comprises three or more lens elements including a cemented lens component and a single lens element and has a positive refractive power as a whole, and three or more lens units which have a vari-focal function and a perfocal function. It is possible to reduce a perfocality deviation amount in this afocal zoom lens system by configuring the lens units so that a perfocality deviation amount produced due to an environmental temperature change reduces perfocality deviation amount produced by each of the lens units so as to satisfy the condition (8) or perfocality deviation to be produced by at least one of the lens units has a value in a direction reverse to that of a perfocality deviation amount to be produced by another lens unit.

For reducing a perfocality deviation amount, it is sufficient to select glass materials while taking temperature coefficients of the lens units into consideration and a power distribution while taking the correcting coefficients into consideration so as to satisfy the condition (8). For example, it is sufficient to select a glass material for each of the lens units while taking a value of perfocality correcting coefficient $\epsilon_i$ of a refractive index and the temperature coefficient (dn/dt) into consideration so that a first lens unit and a second lens unit which has a vari-focal function produce perfocality deviation amounts having signs reverse to each other.

In order to obtain a zoom ratio of 9 or higher, the afocal zoom lens system is composed of four lens units. It is possible to compose a lens system which is composed of four lens units, has a high zoom ratio and high aberration correcting performance, and is free from a shift of optical axis center for the left or right eye due to temperature change by suppressing perfocality deviation to be produced by each lens unit due to an environmental temperature change described above so as to satisfy the condition (8) or selecting glass materials taking temperature coefficients into consideration so that a perfocality deviation amount to be produced by at least one lens unit has a value in a direction reverse to that of a perfocality deviation to be produced by another lens unit.

For suppressing a perfocality deviation in the afocal zoom lens system which has the composition described above satisfying the conditions (1) through (3), or is sufficient to satisfy the condition (8). It is possible to correct chromatic aberration favorably over the entire zoom range and prevent the centers of the optical axes of the zoom lens systems for the left and right eyes from being shifted to a temperature change when the condition (8) is satisfied by configuring at least a lens unit so that it produces a perfocality deviation having a value in a direction reverse to that of a perfocality deviation amount to be produced by another lens unit.

In order to favorably correct chromatic aberration at high magnifications, the secondary spectrum in particular, and reduce perfocality deviation due to a temperature change in the afocal zoom lens system according to the present invention, it is desirable to configure the lens system so as to satisfy not only the conditions (1) through (7) but also the following condition (9):

$$|(dn/dt)_{G1}| < |(dn/dt)_{G2}| \quad (9)$$

wherein the reference symbol $(dn/dt)_{G1}$ represents a value of a temperature coefficient whichever is the largest, or an absolute value which is the smallest, out of temperature coefficients of extraordinarily dispersive glass materials having negative temperature coefficients of positive lens elements used in the first lens unit and the reference symbol $(dn/dt)_{G2}$ designates a temperature coefficient of the positive lens element of the negative cemented lens component consisting of the positive lens element and the negative lens element.

When an extraordinarily dispersive glass material is used for the first lens unit, a perfocality deviation is produced by the first lens unit in a remarkably large amount. Since the perfocality coefficient $\epsilon_i$ of the positive lens element of the negative cemented lens component of the second unit is negative and has a relatively large value, it is possible to sufficiently reduce a perfocality deviation amount by selecting a glass material which has such a temperature coefficient as to satisfy the condition (9).

By selecting such a glass material, it is possible to favorably reduce a perfocality deviation amount to be produced due to a temperature change at high magnification in an afocal zoom lens system as a whole and enhance a vari-focal ratio of the afocal zoom lens system. By using an extraordinarily dispersive material for the positive lens component which composes the first lens unit, it is possible to favorably correct the secondary spectrum and favorably correct aberrations over an entire zoom range. For correction of aberrations, values at a wavelength of 546.07 nm within a temperature range from 20° C. to 40° C. were used as temperature coefficients of relative refractive indices.

Furthermore, it is desirable to satisfy the following condition (10):

$$|A| < (8/100) \times (\beta/2 \times \sin(\theta/2)) \qquad (10)$$

wherein the reference symbol A represents a perfocality deviation amount to be caused in the afocal zoom lens system according to the present invention which satisfies the conditions (1) through (3) and at least one of the conditions (4) through (7), and is kept in an environment of normal temperature of 20° C.±20° C., the reference symbol θ designates an internal inclination angle of a stereoscopic microscope, and the reference symbol β denotes a magnification of a lens system composed of an object, an objective lens, the afocal zoom lens system and an imaging lens system and an intermediate image.

When the condition (10) is satisfied, it is possible to suppress a shift of an image to be observed by the left or right eye within the allowable range in the temperature environment at normal temperature ±20° C.

When the condition (10) is satisfied, the afocal zoom lens system for stereoscopic microscopes according to the present invention which has any of the compositions described above is capable of suppressing a shift amount of the center of the optical axis for the left or right eye within the allowable range regardless of a dynamic environmental change in the temperature environment at normal temperature of 20° C.±20° C. and facilitates stereoscopic observation of fine structures at high magnifications.

By configuring the afocal zoom lens system so as to satisfy the condition (10) even in a temperature environment of normal temperature ±20° C. or higher, it is possible to suppress a shift of the center of the optical axis for the left or right eye in the temperature environment.

The afocal zoom lens system according to the present invention scarcely allows aberration correcting performance thereof to be changed by a temperature change on the order of ±20° C. though it allows only the center of the optical axis for the left or right eye to be shifted due to the perfocality deviation caused by the temperature change. Accordingly, the afocal zoom lens system according to the present invention maintains favorable optical performance thereof and suppresses the shift of the image to be observed by the left or right eye even in the temperature environment at normal temperature ±20° C., thereby facilitating observation of stereoscopic images of cultivated cells and fine structures of eggs in thermostatic chambers as well manipulating works.

An objective lens and imaging lens systems are disposed on the object side and the image side of the afocal zoom lens system according to the present invention described above. Accordingly, the afocal zoom lens system can be used at various imaging magnifications depending on the purpose of use by selecting objective lenses and imaging lens systems which have different focal lengths respectively. Further, it is possible to perform observation in various modes with a coaxial vertical illumination system, a photographic apparatus, a tracing apparatus, a discussion lens barrel or the like interposed between an objective lens and the afocal zoom lens system or between the afocal zoom lens system and an imaging lens system.

Now, description will be made of the preferred embodiments of the afocal zoom lens system according to the present invention.

Figure 1:
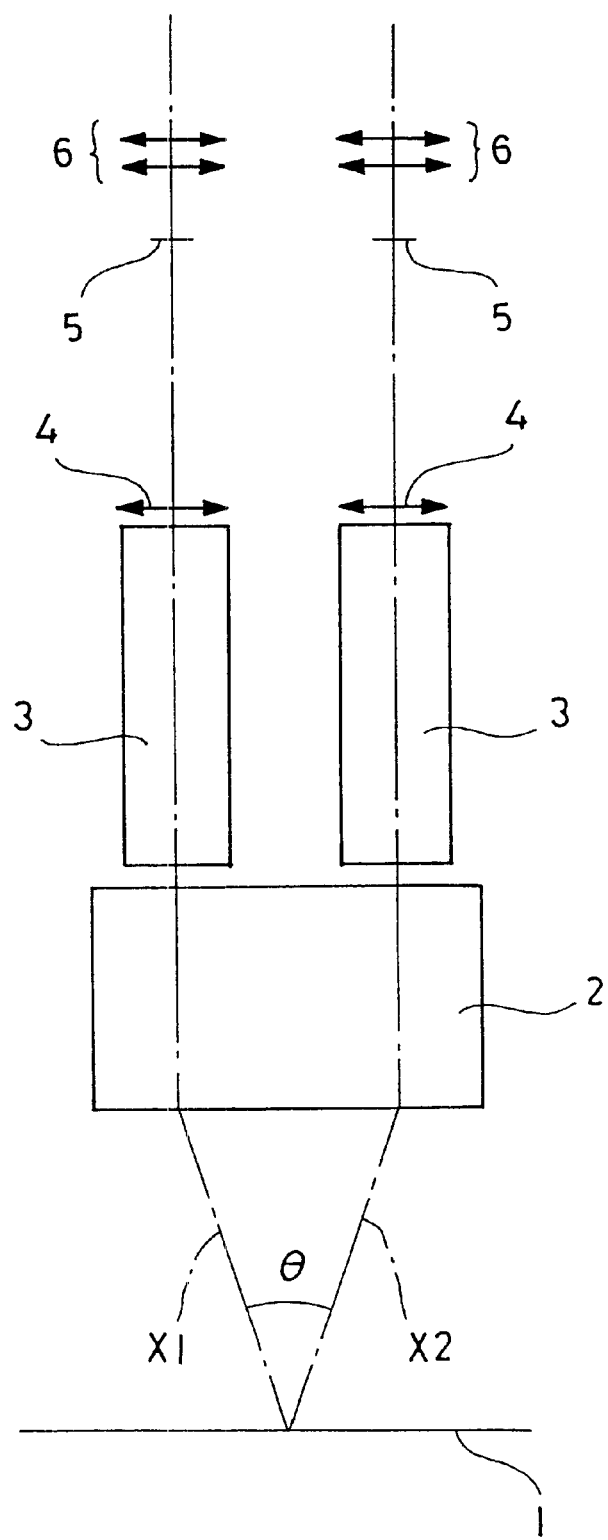
FIG. 1 shows a sectional view illustrating a composition of a conventional Galilean type stereoscopic microscope.
Figure 2:
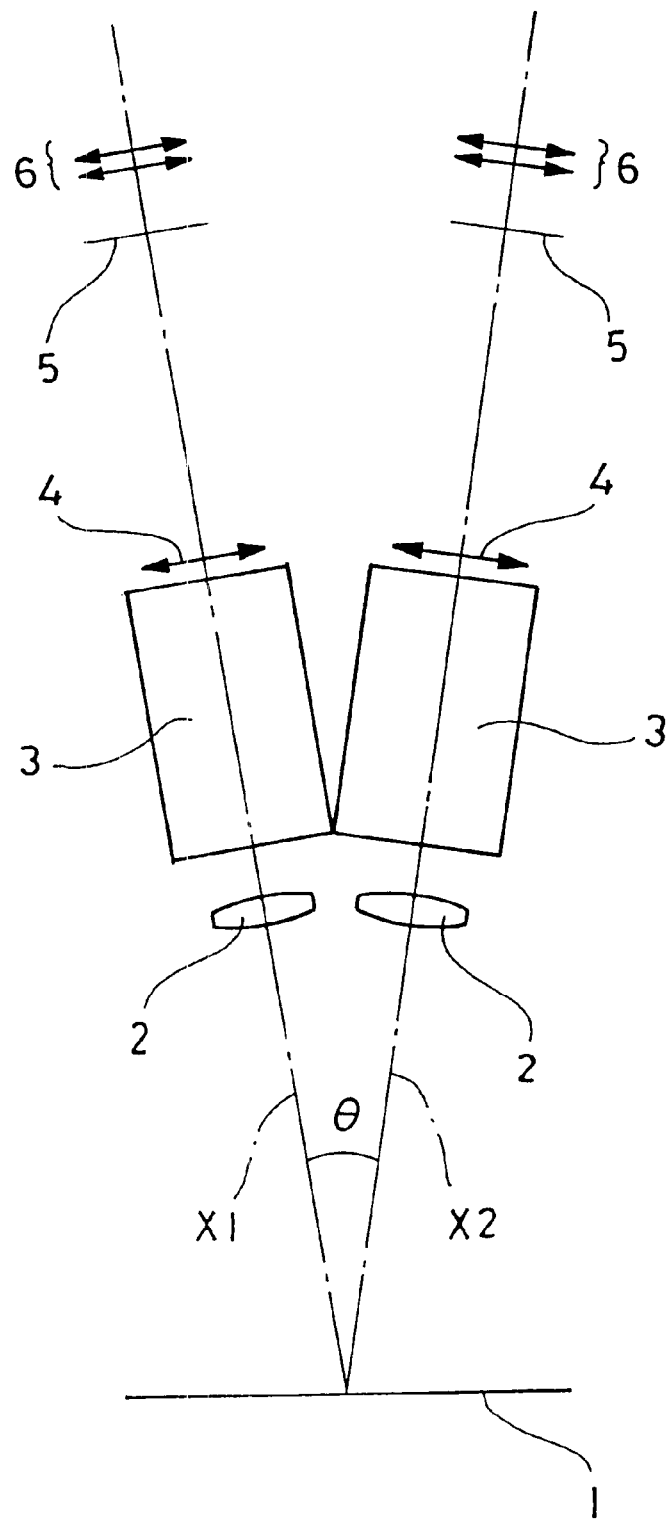
FIG. 2 shows a sectional view illustrating a composition of a conventional Greenough type stereoscopic microscope.
Figure 4:
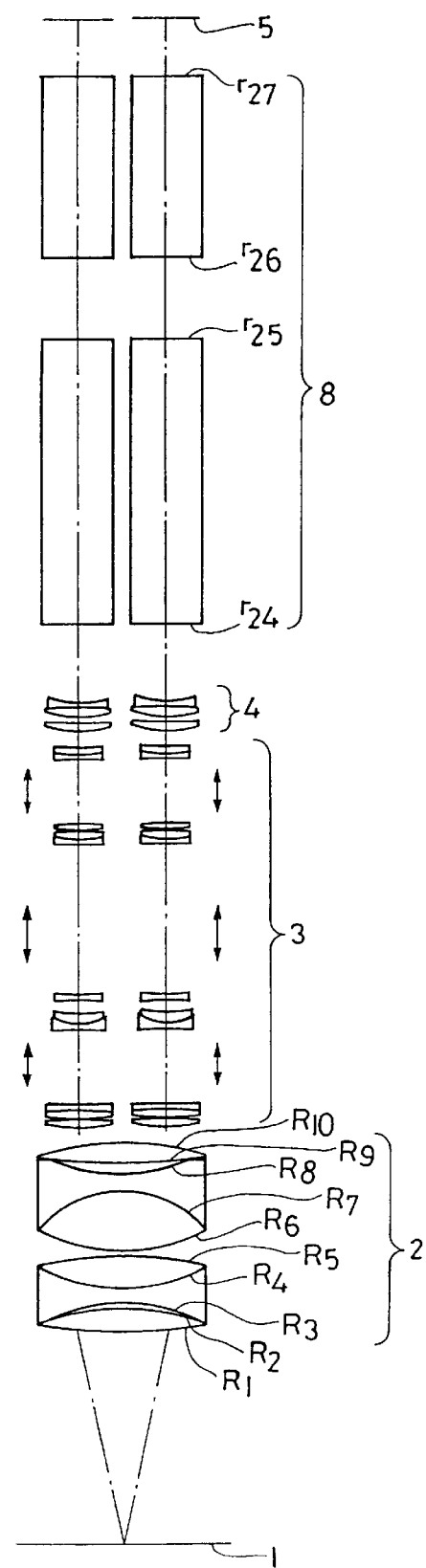
FIG. 4 shows a sectional view illustrating a composition of a stereoscopic microscope equipped with afocal zoom lenses according to the present invention.

First, description will be made of a configuration of a stereoscopic microscope which is equipped with the afocal zoom lens systems according to the present invention. In FIG. 4, a reference numeral 1 represents an object, a reference numeral 2 designates an objective lens system, a reference symbol 3 denotes the afocal zoom lens systems according to the present invention, a reference numeral 4 represents imaging lens systems, a reference numeral 5 designates locations of intermediate images and a reference numeral 8 denotes prisms.

As shown in the drawing, rays coming from the object which is disposed at a front focal point of the objective lens system 2 are incident as parallel light bundles onto the afocal zoom lens systems 3. Parallel light bundles emerging from the afocal zoom lens systems are focused by the imaging lens systems to form the intermediate images 5 at rear focal points of the imaging lens systems. An imaging magnification β at the location of the intermediate image is given by the following formula (f):

$$\beta = \beta_A \times f_{TL}/f_{OB} \qquad (f)$$

wherein the reference symbol $\beta_A$ represents a magnification of the afocal zoom lens system, the reference symbol $f_{TL}$ designates a focal length of the imaging lens system and the reference symbol $f_{OB}$ denotes a focal length of the objective lens system.

As apparent from the formula (f), even the same afocal zoom lens system can have various imaging magnifications by changing a focal length of the objective lens system or the imaging lens system.

The embodiments of the afocal zoom lens system for stereoscopic microscopes according to the present invention have numerical data which is listed below:

Embodiment 1

$r_1 = 53.134$
$\quad d_1 = 2.78 \qquad n_1 = 1.51633 \qquad \nu_1 = 64.1$
$r_2 = -82.820$
$\quad d_2 = 0.3$
$r_3 = 111.588$
$\quad d_3 = 3.0 \qquad n_2 = 1.51633 \qquad \nu_2 = 64.1$
$r_4 = -53.373$
$\quad d_4 = 1.9 \qquad n_3 = 1.83400 \qquad \nu_3 = 37.2$ -continued

| Embodiment 1 | | | |
|---|---|---|---|

$r_5 = 290.084$
    $d_5 = D_1$ (variable)
$r_6 = -61.961$
    $d_6 = 1.8$        $n_4 = 1.58913$    $\nu_4 = 61.2$
$r_7 = 15.248$
    $d_7 = 3.54$       $n_5 = 1.80518$    $\nu_5 = 25.4$
$r_8 = 30.023$
    $d_8 = 3.698$
$r_9 = -95.274$
    $d_9 = 3.47$       $n_6 = 1.67790$    $\nu_6 = 55.3$
$r_{10} = 51.382$
    $d_{10} = D_2$ (variable)
$r_{11} = 247.551$
    $d_{11} = 2.05$    $n_7 = 1.75520$    $\nu_7 = 27.5$
$r_{12} = 48.601$
    $d_{12} = 2.78$    $n_8 = 1.51633$    $\nu_8 = 64.1$
$r_{13} = -75.142$
    $d_{13} = 0.25$
$r_{14} = 63.249$
    $d_{14} = 1.9$     $n_9 = 1.49700$    $\nu_9 = 81.6$
$r_{15} = -78.439$
    $d_{15} = D_3$ (variable)
$r_{16} = -93.353$
    $d_{16} = 1.65$    $n_{10} = 1.60311$ $\nu_{10} = 60.7$
$r_{17} = 36.086$
    $d_{17} = 1.68$    $n_{11} = 1.75520$ $\nu_{11} = 27.5$
$r_{18} = 73.754$
    $d_{18} = 5.0$
$r_{19} = 40.647$
    $d_{19} = 3.0$     $n_{12} = 1.52249$ $\nu_{12} = 59.8$
$r_{20} = 190.448$
    $d_{20} = 2.097$
$r_{21} = 35.524$
    $d_{21} = 3.5$     $n_{13} = 1.48749$ $\nu_{13} = 70.2$
$r_{22} = \infty$
    $d_{22} = 2.0$     $n_{14} = 1.57099$ $\nu_{14} = 50.8$
$r_{23} = 26.819$
    $d_{23} = 27.0$
$r_{24} = \infty$
    $d_{24} = 100.00$  $n_{15} = 1.51633$ $\nu_{15} = 64.1$
$r_{25} = \infty$
    $d_{25} = 28.5$
$r_{26} = \infty$
    $d_{26} = 65.0$    $n_{16} = 1.56883$ $\nu_{16} = 56.3$
$r_{27} = \infty$
    $d_{27} = 19.6031$
$r_{28}$ = intermediate image

| $\beta$ | $D_1$ | $D_2$ | $D_3$ |
|---|---|---|---|
| 0.7 × | 1.300 | 98.453 | 2.450 |
| 2.4 × | 26.037 | 53.319 | 22.846 |
| 9.2 × | 38.369 | 4.083 | 59.751 | zoom ratio 13.1
$f_1 = 82.403$, $f_2 = -22.3 = -0.271 \times f_1$,
$f_3 = 52.374 = 0.636 \times f_1$, $f_4 = -79.7 = -0.967 \times f_1$
$\nu_{1p} - \nu_{1n} = 26.9$, $\nu_{2n} - \nu_{2p} = 35.8$,
$\nu_{3p} - \nu_{3n} = 36.6$
$\nu_{4n} - \nu_{4p} = 33.2$
$f_{1c} = -242.6$, $f_{2c} = -45.4$, $f_{3c} = 199.1$, $f_{4c} = -79.7$
perfocality deviation amounts A
    first lens unit        0.532 mm
    second lens unit      -0.026 mm
    third lens unit        0.346 mm
    fourth lens unit       0.079 mm
    imaging lens system   -0.006 mm
    total                  0.925 mm

| Embodiment 2 | | | |
|---|---|---|---|

$r_1 = 60.616$
    $d_1 = 2.8$        $n_1 = 1.51633$    $\nu_1 = 64.1$
$r_2 = -96.810$
    $d_2 = 0.3$

-continued

| Embodiment 2 | | | |
|---|---|---|---|

$r_3 = 97.414$
    $d_3 = 2.9$        $n_2 = 1.48749$    $\nu_2 = 70.2$
$r_4 = -65.374$
    $d_4 = 2.0$        $n_3 = 1.80100$    $\nu_3 = 35.0$
$r_5 = 383.356$
    $d_5 = D_1$ (variable)
$r_6 = -67.530$
    $d_6 = 1.76$       $n_4 = 1.60311$    $\nu_4 = 60.7$
$r_7 = 14.152$
    $d_7 = 3.45$       $n_5 = 1.75520$    $\nu_5 = 27.5$
$r_8 = 33.278$
    $d_8 = 3.7675$
$r_9 = -90.558$
    $d_9 = 3.75$       $n_6 = 1.67790$    $\nu_6 = 55.3$
$r_{10} = 49.406$
    $d_{10} = D_2$ (variable)
$r_{11} = 138.499$
    $d_{11} = 1.9$     $n_7 = 1.78472$    $\nu_7 = 25.7$
$r_{12} = 45.715$
    $d_{12} = 2.58$    $n_8 = 1.48749$    $\nu_8 = 70.2$
$r_{13} = -82.286$
    $d_{13} = 0.275$
$r_{14} = 62.538$
    $d_{14} = 1.95$    $n_9 = 1.48749$    $\nu_9 = 70.2$
$r_{15} = -75.750$
    $d_{15} = D_3$ (variable)
$r_{16} = -104.855$
    $d_{16} = 1.65$    $n_{10} = 1.65160$ $\nu_{10} = 58.5$
$r_{17} = 38.000$
    $d_{17} = 1.78$    $n_{11} = 1.76182$ $\nu_{11} = 26.5$
$r_{18} = 82.527$
    $d_{18} = 5.0$
$r_{19} = 40.647$
    $d_{19} = 3.0$     $n_{12} = 1.52249$ $\nu_{12} = 59.8$
$r_{20} = 190.448$
    $d_{20} = 2.097$
$r_{21} = 35.524$
    $d_{21} = 3.5$     $n_{13} = 1.48749$ $\nu_{13} = 70.2$
$r_{22} = \infty$
    $d_{22} = 2.0$     $n_{14} = 1.57099$ $\nu_{14} = 50.8$
$r_{23} = 26.819$
    $d_{23} = 27.0$
$r_{24} = \infty$
    $d_{24} = 100.0$   $n_{15} = 1.51633$ $\nu_{15} = 64.1$
$r_{25} = \infty$
    $d_{25} = 28.5$
$r_{26} = \infty$
    $d_{26} = 65.0$    $n_{16} = 1.56883$ $\nu_{16} = 56.3$
$r_{27} = \infty$
    $d_{27} = 19.6031$
$r_{28}$ = intermediate image

| $\beta$ | $D_1$ | $D_2$ | $D_3$ |
|---|---|---|---|
| 0.7 × | 1.300 | 98.383 | 2.450 |
| 2.4 × | 26.022 | 53.308 | 22.808 |
| 9.2 × | 38.363 | 4.082 | 59.693 | zoom ratio 13.1
$f_1 = 81.916$, $f_2 = -22.319 = -0.272 \times f_1$,
$f_3 = 52.257 = 0.638 \times f_1$, $f_4 = -79.272 = -0.968 \times f_1$
$\nu_{1p} - \nu_{1n} = 35.2$, $\nu_{2n} - \nu_{2p} = 33.2$,
$\nu_{3p} - \nu_{3n} = 44.5$
$\nu_{4n} - \nu_{4p} = 32.0$
$f_{1c} = -551.6$, $f_{2c} = -47.8$, $f_{3c} = 196.1$, $f_{4c} = -79.3$
perfocality deviation amounts A
    first lens unit        0.212 mm
    second lens unit       0.622 mm
    third lens unit        0.183 mm
    fourth lens unit       0.045 mm
    imaging lens system   -0.006 mm
    total                  1.056 mm

| Embodiment 3 | | | |
|---|---|---|---|
| $r_1 = 58.322$ | | | |
| | $d_1 = 2.87$ | $n_1 = 1.49700$ | $\nu_1 = 81.6$ |
| $r_2 = -131.159$ | | | |
| | $d_2 = 0.3$ | | |
| $r_3 = 95.204$ | | | |
| | $d_3 = 3.0$ | $n_2 = 1.51633$ | $\nu_2 = 64.1$ |
| $r_4 = -78.067$ | | | |
| | $d_4 = 2.0$ | $n_3 = 1.80100$ | $\nu_3 = 35.0$ |
| $r_5 = 395.312$ | | | |
| | $d_5 = D_1$ (variable) | | |
| $r_6 = -104.626$ | | | |
| | $d_6 = 1.9$ | $n_4 = 1.65160$ | $\nu_4 = 58.5$ |
| $r_7 = 14.501$ | | | |
| | $d_7 = 3.56$ | $n_5 = 1.75520$ | $\nu_5 = 27.5$ |
| $r_8 = 35.937$ | | | |
| | $d_8 = 4.6795$ | | |
| $r_9 = -108.617$ | | | |
| | $d_9 = 1.75$ | $n_6 = 1.74100$ | $\nu_6 = 52.7$ |
| $r_{10} = 47.384$ | | | |
| | $d_{10} = D_2$ (variable) | | |
| $r_{11} = -156.302$ | | | |
| | $d_{11} = 1.4$ | $n_7 = 1.60562$ | $\nu_7 = 43.7$ |
| $r_{12} = 26.061$ | | | |
| | $d_{12} = 2.64$ | $n_8 = 1.49700$ | $\nu_8 = 81.6$ |
| $r_{13} = -78.334$ | | | |
| | $d_{13} = 0.4$ | | |
| $r_{14} = 47.688$ | | | |
| | $d_{14} = 2.4$ | $n_9 = 1.60311$ | $\nu_9 = 60.7$ |
| $r_{15} = -77.133$ | | | |
| | $d_{15} = D_3$ (variable) | | |
| $r_{16} = -227.786$ | | | |
| | $d_{16} = 1.81$ | $n_{10} = 1.65160$ | $\nu_{10} = 58.5$ |
| $r_{17} = 39.653$ | | | |
| | $d_{17} = 2.12$ | $n_{11} = 1.80518$ | $\nu_{11} = 25.4$ |
| $r_{18} = 59.492$ | | | |
| | $d_{18} = 5.0$ | | |
| $r_{19} = 40.647$ | | | |
| | $d_{19} = 3.0$ | $n_{12} = 1.52249$ | $\nu_{12} = 59.8$ |
| $r_{20} = 190.448$ | | | |
| | $d_{20} = 2.097$ | | |
| $r_{21} = 35.524$ | | | |
| | $d_{21} = 3.5$ | $n_{13} = 1.48749$ | $\nu_{13} = 70.2$ |
| $r_{22} = \infty$ | | | |
| | $d_{22} = 2.0$ | $n_{14} = 1.57099$ | $\nu_{14} = 50.8$ |
| $r_{23} = 26.819$ | | | |
| | $d_{23} = 27.0$ | | |
| $r_{24} = \infty$ | | | |
| | $d_{24} = 100.0$ | $n_{15} = 1.51633$ | $\nu_{15} = 64.1$ |
| $r_{25} = \infty$ | | | |
| | $d_{25} = 28.5$ | | |
| $r_{26} = \infty$ | | | |
| | $d_{26} = 65.0$ | $n_{16} = 1.56883$ | $\nu_{16} = 56.3$ |
| $r_{27} = \infty$ | | | |
| | $d_{27} = 19.6031$ | | |
| $r_{28}$ = intermediate image | | | |

| $\beta$ | $D_1$ | $D_2$ | $D_3$ |
|---|---|---|---|
| 0.7 × | 1.817 | 97.711 | 2.642 |
| 2.4 × | 26.124 | 53.180 | 22.866 |
| 9.2 × | 38.402 | 3.825 | 59.944 | zoom ratio 13.1
$f_1 = 81.742$, $f_2 = -22.082 = -0.270 \times f_1$,
$f_3 = 52.338 = 0.640 \times f_1$, $f_4 = -79.773 = -0.976 \times f_1$
$\nu_{1p} - \nu_{1n} = 29.1$, $\nu_{2n} - \nu_{2p} = 31.0$, $\nu_{3p} - \nu_{3n} = 37.9$
$\nu_{4n} - \nu_{4p} = 33.1$
$f_{1C} = -5424.3$, $f_{2C} = -49.6$, $f_{3C} = -624.8$, $f_{4C} = -79.8$
perfocality deviation amounts A

| | |
|---|---|
| first lens unit | 1.948 mm |
| second lens unit | −0.210 mm |
| third lens unit | 0.697 mm |
| fourth lens unit | 0.049 mm |
| imaging lens system | −0.006 mm |
| total | 2.478 mm |

| Embodiment 4 | | | |
|---|---|---|---|
| $r_1 = 265.234$ | | | |
| | $d_1 = 2.0$ | $n_1 = 1.80610$ | $\nu_1 = 40.9$ |
| $r_2 = 33.340$ | | | |
| | $d_2 = 2.8$ | $n_2 = 1.48749$ | $\nu_2 = 70.2$ |
| $r_3 = -211.028$ | | | |
| | $d_3 = 0.3$ | | |
| $r_4 = 37.384$ | | | |
| | $d_4 = 2.9$ | $n_3 = 1.51633$ | $\nu_3 = 64.1$ |
| $r_5 = -164.341$ | | | |
| | $d_5 = D_1$ (variable) | | |
| $r_6 = -161.055$ | | | |
| | $d_6 = 1.9$ | $n_4 = 1.67790$ | $\nu_4 = 55.3$ |
| $r_7 = 15.477$ | | | |
| | $d_7 = 3.6$ | $n_5 = 1.80518$ | $\nu_5 = 25.4$ |
| $r_8 = 37.907$ | | | |
| | $d_8 = 3.7511$ | | |
| $r_9 = -79.361$ | | | |
| | $d_9 = 2.15$ | $n_6 = 1.74100$ | $\nu_6 = 52.7$ |
| $r_{10} = 46.772$ | | | |
| | $d_{10} = D_2$ (variable) | | |
| $r_{11} = -66.286$ | | | |
| | $d_{11} = 2.0$ | $n_7 = 1.80518$ | $\nu_7 = 25.4$ |
| $r_{12} = 38.216$ | | | |
| | $d_{12} = 2.7$ | $n_8 = 1.49700$ | $\nu_8 = 81.6$ |
| $r_{13} = -88.491$ | | | |
| | $d_{13} = 0.255$ | | |
| $r_{14} = 80.371$ | | | |
| | $d_{14} = 2.6$ | $n_9 = 1.51633$ | $\nu_9 = 64.1$ |
| $r_{15} = -142.182$ | | | |
| | $d_{15} = D_3$ (variable) | | |
| $r_{16} = -156.874$ | | | |
| | $d_{16} = 1.7$ | $n_{10} = 1.65160$ | $\nu_{10} = 58.5$ |
| $r_{17} = 33.689$ | | | |
| | $d_{17} = 2.33$ | $n_{11} = 1.72151$ | $\nu_{11} = 29.2$ |
| $r_{18} = 65.495$ | | | |
| | $d_{18} = 5.0$ | | |
| $r_{19} = 40.647$ | | | |
| | $d_{19} = 3.0$ | $n_{12} = 1.52249$ | $\nu_{12} = 59.8$ |
| $r_{20} = 190.448$ | | | |
| | $d_{20} = 2.097$ | | |
| $r_{21} = 35.524$ | | | |
| | $d_{21} = 3.5$ | $n_{13} = 1.48749$ | $\nu_{13} = 70.2$ |
| $r_{22} = \infty$ | | | |
| | $d_{22} = 2.0$ | $n_{14} = 1.57099$ | $\nu_{14} = 50.8$ |
| $r_{23} = 26.819$ | | | |
| | $d_{23} = 27.0$ | | |
| $r_{24} = \infty$ | | | |
| | $d_{24} = 100.0$ | $n_{15} = 1.51633$ | $\nu_{15} = 64.1$ |
| $r_{25} = \infty$ | | | |
| | $d_{25} = 28.5$ | | |
| $r_{26} = \infty$ | | | |
| | $d_{26} = 65.0$ | $n_{16} = 1.56883$ | $\nu_{16} = 56.3$ |
| $r_{27} = \infty$ | | | |
| | $d_{27} = 19.6031$ | | |
| $r_{28}$ = intermediate image | | | |

| $\beta$ | $D_1$ | $D_2$ | $D_3$ |
|---|---|---|---|
| 0.7 × | 1.479 | 97.919 | 2.616 |
| 2.4 × | 25.908 | 53.481 | 22.624 |
| 9.2 × | 38.415 | 3.793 | 59.806 | zoom ratio 13.1
$f_1 = 77.453$, $f_2 = -22.544 = -0.291 \times f_1$,
$f_3 = 51.520 = 0.665 \times f_1$, $f_4 = -75.966 = -0.981 \times f_1$
$\nu_{1p} - \nu_{1n} = 29.3$, $\nu_{2n} - \nu_{2p} = 29.9$, $\nu_{3p} - \nu_{3n} = 56.2$
$\nu_{4n} - \nu_{4p} = 29.3$
$f_{1C} = -240.7$, $f_{2C} = -58.4$, $f_{3C} = 103.2$, $f_{4C} = -76.0$
perfocality deviation amounts A

| | |
|---|---|
| first lens unit | 2.123 mm |
| second lens unit | −0.734 mm |
| third lens unit | 0.543 mm |
| fourth lens unit | 0.035 mm |
| imaging lens system | −0.006 mm |
| total | 1.961 mm |

Embodiment 5

| | | | |
|---|---|---|---|
| $r_1 = 76.638$ | | | |
| | $d_1 = 3.1$ | $n_1 = 1.51633$ | $\nu_1 = 64.1$ |
| $r_2 = -49.553$ | | | |
| | $d_2 = 1.86$ | $n_2 = 1.80100$ | $\nu_2 = 35.0$ |
| $r_3 = -306.191$ | | | |
| | $d_3 = 0.3$ | | |
| $r_4 = 107.447$ | | | |
| | $d_4 = 2.15$ | $n_3 = 1.49700$ | $\nu_3 = 81.6$ |
| $r_5 = -107.447$ | | | |
| | $d_5 = D_1$ (variable) | | |
| $r_6 = -108.043$ | | | |
| | $d_6 = 1.84$ | $n_4 = 1.67790$ | $\nu_4 = 55.3$ |
| $r_7 = 15.223$ | | | |
| | $d_7 = 3.76$ | $n_5 = 1.80518$ | $\nu_5 = 25.4$ |
| $r_8 = 37.579$ | | | |
| | $d_8 = 4.4577$ | | |
| $r_9 = -97.253$ | | | |
| | $d_9 = 1.75$ | $n_6 = 1.72916$ | $\nu_6 = 54.7$ |
| $r_{10} = 48.029$ | | | |
| | $d_{10} = D_2$ (variable) | | |
| $r_{11} = 92.536$ | | | |
| | $d_{11} = 2.4$ | $n_7 = 1.80518$ | $\nu_7 = 25.4$ |
| $r_{12} = 40.598$ | | | |
| | $d_{12} = 2.6$ | $n_8 = 1.49700$ | $\nu_8 = 81.6$ |
| $r_{13} = -130.354$ | | | |
| | $d_{13} = 0.25$ | | |
| $r_{14} = 66.759$ | | | |
| | $d_{14} = 2.36$ | $n_9 = 1.58913$ | $\nu_9 = 61.2$ |
| $r_{15} = -100.135$ | | | |
| | $d_{15} = D_3$ (variable) | | |
| $r_{16} = -169.747$ | | | |
| | $d_{16} = 2.2$ | $n_{10} = 1.67790$ | $\nu_{10} = 55.3$ |
| $r_{17} = 29.398$ | | | |
| | $d_{17} = 2.76$ | $n_{11} = 1.72151$ | $\nu_{11} = 29.2$ |
| $r_{18} = 69.345$ | | | |
| | $d_{18} = 5.0$ | | |
| $r_{19} = 40.647$ | | | |
| | $d_{19} = 3.0$ | $n_{12} = 1.52249$ | $\nu_{12} = 59.8$ |
| $r_{20} = 190.448$ | | | |
| | $d_{20} = 2.097$ | | |
| $r_{21} = 35.524$ | | | |
| | $d_{21} = 3.5$ | $n_{13} = 1.48749$ | $\nu_{13} = 70.2$ |
| $r_{22} = \infty$ | | | |
| | $d_{22} = 2.0$ | $n_{14} = 1.57099$ | $\nu_{14} = 50.8$ |
| $r_{23} = 26.819$ | | | |
| | $d_{23} = 27.0$ | | |
| $r_{24} = \infty$ | | | |
| | $d_{24} = 100.0$ | $n_{15} = 1.51633$ | $\nu_{15} = 64.1$ |
| $r_{25} = \infty$ | | | |
| | $d_{25} = 28.5$ | | |
| $r_{26} = \infty$ | | | |
| | $d_{26} = 65.0$ | $n_{16} = 1.56883$ | $\nu_{16} = 56.3$ |
| $r_{27} = \infty$ | | | |
| | $d_{27} = 19.6031$ | | |
| $r_{28}$ = intermediate image | | | |

| $\beta$ | $D_1$ | $D_2$ | $D_3$ |
|---|---|---|---|
| 0.7 × | 1.300 | 97.462 | 2.450 |
| 2.4 × | 25.846 | 52.794 | 22.572 |
| 9.2 × | 38.312 | 3.236 | 59.664 | zoom ratio 13.1
$f_1 = 78.756$, $f_2 = -22.500 = -0.286 \times f_1$,
$f_3 = 51.737 = 0.657 \times f_1$, $f_4 = -76.903 = -0.976 \times f_1$
$\nu_{1p} - \nu_{1n} = 29.1$, $\nu_{2n} - \nu_{2p} = 29.9$, $\nu_{3p} - \nu_{3n} = 56.2$
$\nu_{4n} - \nu_{4p} = 26.1$
$f_{1C} = -274.1$, $f_{2C} = -51.7$, $f_{3C} = 201.7$, $f_{4C} = -76.9$
perfocality deviation amounts A

| | |
|---|---|
| first lens unit | 1.288 mm |
| second lens unit | -0.758 mm |
| third lens unit | 0.337 mm |
| fourth lens unit | -0.015 mm |
| imaging lens system | -0.006 mm |
| total | 0.846 mm |

Embodiment 6

| | | | |
|---|---|---|---|
| $r_1 = 55.775$ | | | |
| | $d_1 = 2.77$ | $n_1 = 1.49700$ | $\nu_1 = 81.6$ |
| $r_2 = -113.831$ | | | |
| | $d_2 = 0.3$ | | |
| $r_3 = 151.399$ | | | |
| | $d_3 = 3.0$ | $n_2 = 1.56883$ | $\nu_2 = 56.3$ |
| $r_4 = -57.905$ | | | |
| | $d_4 = 1.87$ | $n_3 = 1.80100$ | $\nu_3 = 35.0$ |
| $r_5 = 784.659$ | | | |
| | $d_5 = D_1$ (variable) | | |
| $r_6 = -70.517$ | | | |
| | $d_6 = 1.78$ | $n_4 = 1.63930$ | $\nu_4 = 44.9$ |
| $r_7 = 14.179$ | | | |
| | $d_7 = 3.6$ | $n_5 = 1.80518$ | $\nu_5 = 25.4$ |
| $r_8 = 46.389$ | | | |
| | $d_8 = 4.4411$ | | |
| $r_9 = -83.725$ | | | |
| | $d_9 = 2.26$ | $n_6 = 1.67790$ | $\nu_6 = 55.3$ |
| $r_{10} = 34.852$ | | | |
| | $d_{10} = D_2$ (variable) | | |
| $r_{11} = 495.280$ | | | |
| | $d_{11} = 1.94$ | $n_7 = 1.72342$ | $\nu_7 = 38.0$ |
| $r_{12} = 27.061$ | | | |
| | $d_{12} = 2.66$ | $n_8 = 1.56883$ | $\nu_8 = 56.3$ |
| $r_{13} = -130.922$ | | | |
| | $d_{13} = 0.25$ | | |
| $r_{14} = 48.114$ | | | |
| | $d_{14} = 2.0$ | $n_9 = 1.48749$ | $\nu_9 = 70.2$ |
| $r_{15} = -54.903$ | | | |
| | $d_{15} = D_3$ (variable) | | |
| $r_{16} = -97.008$ | | | |
| | $d_{16} = 1.7$ | $n_{10} = 1.70154$ | $\nu_{10} = 41.2$ |
| $r_{17} = 31.924$ | | | |
| | $d_{17} = 2.0$ | $n_{11} = 1.78470$ | $\nu_{11} = 26.3$ |
| $r_{18} = 101.307$ | | | |
| | $d_{18} = 5.0$ | | |
| $r_{19} = 40.647$ | | | |
| | $d_{19} = 3.0$ | $n_{12} = 1.52249$ | $\nu_{12} = 59.8$ |
| $r_{20} = 190.448$ | | | |
| | $d_{20} = 2.097$ | | |
| $r_{21} = 35.524$ | | | |
| | $d_{21} = 3.5$ | $n_{13} = 1.48749$ | $\nu_{13} = 70.2$ |
| $r_{22} = \infty$ | | | |
| | $d_{22} = 2.0$ | $n_{14} = 1.57099$ | $\nu_{14} = 50.8$ |
| $r_{23} = 26.819$ | | | |
| | $d_{23} = 27.0$ | | |
| $r_{24} = \infty$ | | | |
| | $d_{24} = 100.0$ | $n_{15} = 1.51633$ | $\nu_{15} = 64.1$ |
| $r_{25} = \infty$ | | | |
| | $d_{25} = 28.5$ | | |
| $r_{26} = \infty$ | | | |
| | $d_{26} = 65.0$ | $n_{16} = 1.56883$ | $\nu_{16} = 56.3$ |
| $r_{27} = \infty$ | | | |
| | $d_{27} = 19.6031$ | | |
| $r_{28}$ = intermediate image | | | |

| $\beta$ | $D_1$ | $D_2$ | $D_3$ |
|---|---|---|---|
| 0.7 × | 1.449 | 98.526 | 2.455 |
| 2.4 × | 25.994 | 53.696 | 22.739 |
| 9.2 × | 38.389 | 4.122 | 59.917 | zoom ratio 13.1
$f_1 = 82.412$, $f_2 = -22.341 = -0.271 \times f_1$,
$f_3 = 52.303 = 0.635 \times f_1$, $f_4 = -80.324 = -0.975 \times f_1$
$\nu_{1p} - \nu_{1n} = 21.3$, $\nu_{2n} - \nu_{2p} = 19.5$, $\nu_{3p} - \nu_{3n} = 18.3$
$\nu_{4n} - \nu_{4p} = 14.9$
$f_{1C} = -808.3$, $f_{2C} = -68.1$, $f_{3C} = 7912.9$, $f_{4C} = -80.3$
perfocality deviation amounts A

| | |
|---|---|
| first lens unit | 2.481 mm |
| second lens unit | -0.580 mm |
| third lens unit | 0.360 mm |
| fourth lens unit | 0.140 mm |
| imaging lens system | -0.006 mm |
| total | 2.395 mm |

| Embodiment 7 | | | |
|---|---|---|---|
| $r_1 = 51.353$ | | | |
| | $d_1 = 2.86$ | $n_1 = 1.51633$ | $\nu_1 = 64.1$ |
| $r_2 = -102.622$ | | | |
| | $d_2 = 0.3$ | | |
| $r_3 = 115.903$ | | | |
| | $d_3 = 2.96$ | $n_2 = 1.49700$ | $\nu_2 = 81.6$ |
| $r_4 = -61.889$ | | | |
| | $d_4 = 1.91$ | $n_3 = 1.83400$ | $\nu_3 = 37.2$ |
| $r_5 = 425.779$ | | | |
| | $d_5 = D_1$ (variable) | | |
| $r_6 = -75.253$ | | | |
| | $d_6 = 1.69$ | $n_4 = 1.67790$ | $\nu_4 = 55.3$ |
| $r_7 = 14.571$ | | | |
| | $d_7 = 3.54$ | $n_5 = 1.80518$ | $\nu_5 = 25.4$ |
| $r_8 = 34.593$ | | | |
| | $d_8 = 4.2544$ | | |
| $r_9 = -165.633$ | | | |
| | $d_9 = 1.77$ | $n_6 = 1.74100$ | $\nu_6 = 52.7$ |
| $r_{10} = 52.037$ | | | |
| | $d_{10} = D_2$ (variable) | | |
| $r_{11} = 161.506$ | | | |
| | $d_{11} = 1.98$ | $n_7 = 1.80518$ | $\nu_7 = 25.4$ |
| $r_{12} = 52.287$ | | | |
| | $d_{12} = 2.68$ | $n_8 = 1.49700$ | $\nu_8 = 81.6$ |
| $r_{13} = -79.619$ | | | |
| | $d_{13} = 0.385$ | | |
| $r_{14} = 66.800$ | | | |
| | $d_{14} = 2.93$ | $n_9 = 1.51633$ | $\nu_9 = 64.1$ |
| $r_{15} = -82.125$ | | | |
| | $d_{15} = D_3$ (variable) | | |
| $r_{16} = -100.561$ | | | |
| | $d_{16} = 1.76$ | $n_{10} = 1.65160$ | $\nu_{10} = 58.5$ |
| $r_{17} = 41.701$ | | | |
| | $d_{17} = 1.8$ | $n_{11} = 1.80518$ | $\nu_{11} = 25.4$ |
| $r_{18} = 82.069$ | | | |
| | $d_{18} = 5.0$ | | |
| $r_{19} = 40.647$ | | | |
| | $d_{19} = 3.0$ | $n_{12} = 1.52249$ | $\nu_{12} = 59.8$ |
| $r_{20} = 190.448$ | | | |
| | $d_{20} = 2.097$ | | |
| $r_{21} = 35.524$ | | | |
| | $d_{21} = 3.5$ | $n_{13} = 1.48749$ | $\nu_{13} = 70.2$ |
| $r_{22} = \infty$ | | | |
| | $d_{22} = 2.0$ | $n_{14} = 1.57099$ | $\nu_{14} = 50.8$ |
| $r_{23} = 26.819$ | | | |
| | $d_{23} = 27.0$ | | |
| $r_{24} = \infty$ | | | |
| | $d_{24} = 100.0$ | $n_{15} = 1.51633$ | $\nu_{15} = 64.1$ |
| $r_{25} = \infty$ | | | |
| | $d_{25} = 28.5$ | | |
| $r_{26} = \infty$ | | | |
| | $d_{26} = 65.0$ | $n_{16} = 1.56883$ | $\nu_{16} = 56.3$ |
| $r_{27} = \infty$ | | | |
| | $d_{27} = 19.6031$ | | |
| $r_{28}$ = intermediate image | | | |

| $\beta$ | $D_1$ | $D_2$ | $D_3$ |
|---|---|---|---|
| 0.7 × | 1.300 | 98.430 | 2.450 |
| 2.4 × | 26.023 | 53.330 | 22.828 |
| 9.2 × | 38.341 | 4.157 | 59.682 | zoom ratio 13.1
$f_1 = 81.585$, $f_2 = -22.281 = -0.273 \times f_1$,
$f_3 = 52.311 = 0.641 \times f_1$, $f_4 = -78.882 = -0.967 \times f_1$
$\nu_{1p} - \nu_{1n} = 44.4$, $\nu_{2n} - \nu_{2p} = 29.9$, $\nu_{3p} - \nu_{3n} = 56.2$
$\nu_{4n} - \nu_{4p} = 33.1$
$f_{1C} = -327.3$, $f_{2C} = -42.2$, $f_{3C} = 187.2$, $f_{4C} = -78.9$
perfocality deviation amounts A

| | |
|---|---|
| first lens unit | 2.702 mm |
| second lens unit | −0.714 mm |
| third lens unit | 0.368 mm |
| fourth lens unit | 0.052 mm |
| imaging lens system | −0.006 mm |
| total | 2.402 mm | wherein the reference symbols $r_1, r_2, \ldots$ represent radii of curvature on surfaces of respective lens elements, the reference symbols $d_1, d_2, \ldots$ designate thicknesses of the respective lens elements and airspaces reserved therebetween, the reference symbols $n_1, n_2, \ldots$ denote refractive indices of the respective lens elements, the reference symbols $\nu_1, \nu_2, \ldots$ represent Abbe's numbers of the respective lens elements, and the reference symbols $f_{1C}, f_{2C}, f_{3C}$ and $f_{4C}$ designate focal lengths of cemented lens components used in the first lens unit, the second lens unit, third lens unit and the fourth lens unit respectively. In addition, lengths are indicated in millimeters in the numerical data.

Kinds, values of dn/dt and values of $\epsilon$ of glass materials for the lens elements used in the embodiments of the present invention are as listed below:

| Embodiment 1 | | | |
|---|---|---|---|
| $n_1$ | S-BSL7 | dn/dt = 2.8 | $\epsilon = -0.184 \times 10^5$ |
| $n_2$ | S-BSL7 | dn/dt = 2.8 | $\epsilon = -0.152 \times 10^5$ |
| $n_3$ | S-LAH60 | dn/dt = 8.1 | $\epsilon = 0.149 \times 10^5$ |
| $n_4$ | S-BAL35 | dn/dt = 3.9 | $\epsilon = 0.123 \times 10^5$ |
| $n_5$ | PBH6 | dn/dt = 11.4 | $\epsilon = -0.466 \times 10^4$ |
| $n_6$ | S-LAL12 | dn/dt = 1.1 | $\epsilon = 0.352 \times 10^4$ |
| $n_7$ | S-TIH4 | dn/dt = 2.6 | $\epsilon = 0.221 \times 10^4$ |
| $n_8$ | S-BSL7 | dn/dt = 2.8 | $\epsilon = -0.435 \times 10^4$ |
| $n_9$ | S-FPL51 | dn/dt = −6.2 | $\epsilon = -0.383 \times 10^4$ |
| $n_{10}$ | S-BSM14 | dn/dt = 3.2 | $\epsilon = 0.176 \times 10^4$ |
| $n_{11}$ | S-TIH4 | dn/dt = 2.6 | $\epsilon = -0.642 \times 10^3$ |
| $n_{12}$ | S-NSL5 | dn/dt = 1.6 | $\epsilon = -0.850 \times 10^3$ |
| $n_{13}$ | S-FSL5 | dn/dt = −0.6 | $\epsilon = -0.108 \times 10^4$ |
| $n_{14}$ | S-BAL2 | dn/dt = 0.2 | $\epsilon = 0.127 \times 10^4$ |
| $n_{15}$ | S-BSL7 | dn/dt = 2.8 | $\epsilon = 0.434 \times 10^2$ |
| $n_{16}$ | S-BAL14 | dn/dt = 2.0 | $\epsilon = 0.264 \times 10^2$ |

| Embodiment 2 | | | |
|---|---|---|---|
| $n_1$ | S-BSL7 | dn/dt = 2.8 | $\epsilon = -0.163 \times 10^5$ |
| $n_2$ | S-FSL7 | dn/dt = −0.6 | $\epsilon = -0.144 \times 10^5$ |
| $n_3$ | S-LAM66 | dn/dt = 4.0 | $\epsilon = 0.119 \times 10^5$ |
| $n_4$ | S-BSM14 | dn/dt = 3.2 | $\epsilon = 0.131 \times 10^5$ |
| $n_5$ | S-TIH4 | dn/dt = 2.6 | $\epsilon = -0.574 \times 10^4$ |
| $n_6$ | S-LAL12 | dn/dt = 1.1 | $\epsilon = 0.375 \times 10^4$ |
| $n_7$ | S-TIH11 | dn/dt = 2.1 | $\epsilon = 0.197 \times 10^4$ |
| $n_8$ | S-FSL5 | dn/dt = −0.6 | $\epsilon = -0.439 \times 10^4$ |
| $n_9$ | S-FSL5 | dn/dt = −0.6 | $\epsilon = -0.393 \times 10^4$ |
| $n_{10}$ | S-LAL7 | dn/dt = 2.3 | $\epsilon = 0.164 \times 10^4$ |
| $n_{11}$ | S-TIH14 | dn/dt = 2.4 | $\epsilon = -0.642 \times 10^3$ |
| $n_{12}$ | S-NSL5 | dn/dt = 1.6 | $\epsilon = -0.850 \times 10^3$ |
| $n_{13}$ | S-FSL5 | dn/dt = −0.6 | $\epsilon = -0.108 \times 10^4$ |
| $n_{14}$ | S-BAL2 | dn/dt = 0.2 | $\epsilon = 0.127 \times 10^4$ |
| $n_{15}$ | S-BSL7 | dn/dt = 2.8 | $\epsilon = 0.434 \times 10^2$ |
| $n_{16}$ | S-BAL14 | dn/dt = 2.0 | $\epsilon = 0.264 \times 10^2$ |

| Embodiment 3 | | | |
|---|---|---|---|
| $n_1$ | S-FPL51 | dn/dt = −6.2 | $\epsilon = -0.152 \times 10^5$ |
| $n_2$ | S-BSL7 | dn/dt = 2.8 | $\epsilon = -0.133 \times 10^5$ |
| $n_3$ | S-LAM66 | dn/dt = 4.0 | $\epsilon = 0.101 \times 10^5$ |
| $n_4$ | S-LAL7 | dn/dt = 2.3 | $\epsilon = 0.119 \times 10^5$ |
| $n_5$ | PBH4 | dn/dt = 9.3 | $\epsilon = -0.573 \times 10^4$ |
| $n_6$ | S-LAL61 | dn/dt = 4.4 | $\epsilon = 0.351 \times 10^4$ |
| $n_7$ | S-BAM4 | dn/dt = 1.7 | $\epsilon = 0.597 \times 10^4$ |
| $n_8$ | S-FPL51 | dn/dt = −6.2 | $\epsilon = -0.634 \times 10^4$ |
| $n_9$ | S-BSM14 | dn/dt = 3.2 | $\epsilon = -0.457 \times 10^4$ |
| $n_{10}$ | S-LAL7 | dn/dt = 2.3 | $\epsilon = 0.137 \times 10^4$ |
| $n_{11}$ | S-TIH6 | dn/dt = 1.8 | $\epsilon = -0.400 \times 10^3$ |
| $n_{12}$ | S-NSL5 | dn/dt = 1.6 | $\epsilon = -0.850 \times 10^3$ |
| $n_{13}$ | S-FSL5 | dn/dt = −0.6 | $\epsilon = -0.108 \times 10^4$ |
| $n_{14}$ | S-BAL2 | dn/dt = 0.2 | $\epsilon = 0.127 \times 10^4$ |

-continued

Embodiment 3

| | | | |
|---|---|---|---|
| $n_{15}$ | S-BSL7 | dn/dt = 2.8 | $\epsilon = 0.434 \times 10^2$ |
| $n_{16}$ | S-BAL14 | dn/dt = 2.0 | $\epsilon = 0.264 \times 10^2$ |

Embodiment 4

| | | | |
|---|---|---|---|
| $n_1$ | S-LAH53 | dn/dt = 7.3 | $\epsilon = 0.205 \times 10^5$ |
| $n_2$ | S-FSL5 | dn/dt = -0.6 | $\epsilon = -0.208 \times 10^5$ |
| $n_3$ | S-BSL7 | dn/dt = 2.8 | $\epsilon = 0.200 \times 10^5$ |
| $n_4$ | S-LAL12 | dn/dt = 1.1 | $\epsilon = 0.124 \times 10^5$ |
| $n_5$ | PBH6 | dn/dt = 11.4 | $\epsilon = -0.616 \times 10^4$ |
| $n_6$ | S-LAL61 | dn/dt = 4.4 | $\epsilon = 0.452 \times 10^4$ |
| $n_7$ | S-TIH6 | dn/dt = 1.8 | $\epsilon = 0.159 \times 10^4$ |
| $n_8$ | S-FPL51 | dn/dt = -6.2 | $\epsilon = -0.518 \times 10^4$ |
| $n_9$ | S-BSL7 | dn/dt = 2.8 | $\epsilon = -0.279 \times 10^4$ |
| $n_{10}$ | S-LAL7 | dn/dt = 2.3 | $\epsilon = 0.167 \times 10^4$ |
| $n_{11}$ | S-TIH18 | dn/dt = 3.1 | $\epsilon = -0.667 \times 10^3$ |
| $n_{12}$ | S-NSL5 | dn/dt = 1.6 | $\epsilon = -0.850 \times 10^3$ |
| $n_{13}$ | S-FSL5 | dn/dt = -0.6 | $\epsilon = -0.108 \times 10^4$ |
| $n_{14}$ | S-BAL2 | dn/dt = 0.2 | $\epsilon = 0.127 \times 10^4$ |
| $n_{15}$ | S-BSL7 | dn/dt = 2.8 | $\epsilon = 0.434 \times 10^2$ |
| $n_{16}$ | S-BAL14 | dn/dt = 2.0 | $\epsilon = 0.264 \times 10^2$ |

Embodiment 5

| | | | |
|---|---|---|---|
| $n_1$ | S-BSL7 | dn/dt = 2.8 | $\epsilon = -0.196 \times 10^5$ |
| $n_2$ | S-LAM66 | dn/dt = 4.0 | $\epsilon = 0.123 \times 10^5$ |
| $n_3$ | S-FPL51 | dn/dt = -6.2 | $\epsilon = -0.113 \times 10^5$ |
| $n_4$ | S-LAL12 | dn/dt = 1.1 | $\epsilon = 0.128 \times 10^5$ |
| $n_5$ | PBH6 | dn/dt = 11.4 | $\epsilon = -0.608 \times 10^4$ |
| $n_6$ | S-LAL18 | dn/dt = 4.3 | $\epsilon = 0.403 \times 10^4$ |
| $n_7$ | S-TIH6 | dn/dt = 1.8 | $\epsilon = 0.195 \times 10^4$ |
| $n_8$ | S-FPL51 | dn/dt = -6.2 | $\epsilon = -0.435 \times 10^4$ |
| $n_9$ | S-BAL35 | dn/dt = 3.9 | $\epsilon = -0.350 \times 10^4$ |
| $n_{10}$ | S-LAL12 | dn/dt = 1.1 | $\epsilon = 0.186 \times 10^4$ |
| $n_{11}$ | S-TIH18 | dn/dt = 3.1 | $\epsilon = -0.903 \times 10^3$ |
| $n_{12}$ | S-NSL5 | dn/dt = 1.6 | $\epsilon = -0.850 \times 10^3$ |
| $n_{13}$ | S-FSL5 | dn/dt = -0.6 | $\epsilon = -0.108 \times 10^4$ |
| $n_{14}$ | S-BAL2 | dn/dt = 0.2 | $\epsilon = 0.127 \times 10^4$ |
| $n_{15}$ | S-BSL7 | dn/dt = 2.8 | $\epsilon = 0.434 \times 10^2$ |
| $n_{16}$ | S-BAL14 | dn/dt = 2.0 | $\epsilon = 0.264 \times 10^2$ |

Embodiment 6

| | | | |
|---|---|---|---|
| $n_1$ | S-FPL51 | dn/dt = -6.2 | $\epsilon = -0.163 \times 10^5$ |
| $n_2$ | S-BAL14 | dn/dt = 2.0 | $\epsilon = -0.135 \times 10^5$ |
| $n_3$ | S-LAM66 | dn/dt = 4.0 | $\epsilon = 0.125 \times 10^5$ |
| $n_4$ | S-BAM12 | dn/dt = 3.3 | $\epsilon = 0.135 \times 10^5$ |
| $n_5$ | PBH6 | dn/dt = 11.4 | $\epsilon = -0.691 \times 10^4$ |
| $n_6$ | S-LAL12 | dn/dt = 1.1 | $\epsilon = 0.473 \times 10^4$ |
| $n_7$ | S-BAH28 | dn/dt = 5.6 | $\epsilon = 0.463 \times 10^4$ |
| $n_8$ | S-BAL14 | dn/dt = 2.0 | $\epsilon = -0.550 \times 10^4$ |
| $n_9$ | S-FSL5 | dn/dt = -0.6 | $\epsilon = -0.514 \times 10^4$ |
| $n_{10}$ | S-BAH27 | dn/dt = 4.7 | $\epsilon = 0.190 \times 10^4$ |
| $n_{11}$ | S-TIH23 | dn/dt = 2.0 | $\epsilon = -0.960 \times 10^3$ |
| $n_{12}$ | S-NSL5 | dn/dt = 1.6 | $\epsilon = -0.850 \times 10^3$ |
| $n_{13}$ | S-FSL5 | dn/dt = -0.6 | $\epsilon = -0.108 \times 10^4$ |
| $n_{14}$ | S-BAL2 | dn/dt = 0.2 | $\epsilon = 0.127 \times 10^4$ |
| $n_{15}$ | S-BSL7 | dn/dt = 2.8 | $\epsilon = 0.434 \times 10^2$ |
| $n_{16}$ | S-BAL14 | dn/dt = 2.0 | $\epsilon = 0.264 \times 10^2$ |

Embodiment 7

| | | | |
|---|---|---|---|
| $n_1$ | S-BSL7 | dn/dt = 2.8 | $\epsilon = -0.176 \times 10^5$ |
| $n_2$ | S-FPL51 | dn/dt = -6.2 | $\epsilon = -0.138 \times 10^5$ |
| $n_3$ | S-LAH60 | dn/dt = 8.1 | $\epsilon = 0.122 \times 10^5$ |
| $n_4$ | S-LAL12 | dn/dt = 1.1 | $\epsilon = 0.122 \times 10^5$ |
| $n_5$ | PBH6 | dn/dt = 11.4 | $\epsilon = -0.547 \times 10^4$ |
| $n_6$ | S-LAL61 | dn/dt = 4.4 | $\epsilon = 0.301 \times 10^4$ |
| $n_7$ | S-TIH6 | dn/dt = 1.8 | $\epsilon = 0.175 \times 10^4$ |
| $n_8$ | S-FPL51 | dn/dt = -6.2 | $\epsilon = -0.412 \times 10^4$ |
| $n_9$ | S-BSL7 | dn/dt = 2.8 | $\epsilon = -0.368 \times 10^4$ |
| $n_{10}$ | S-LAL7 | dn/dt = 2.3 | $\epsilon = 0.155 \times 10^4$ |
| $n_{11}$ | S-TIH6 | dn/dt = 1.8 | $\epsilon = -0.536 \times 10^3$ |
| $n_{12}$ | S-NSL5 | dn/dt = 1.6 | $\epsilon = -0.850 \times 10^3$ |
| $n_{13}$ | S-FSL5 | dn/dt = -0.6 | $\epsilon = -0.108 \times 10^4$ |
| $n_{14}$ | S-BAL2 | dn/dt = 0.2 | $\epsilon = 0.127 \times 10^4$ |
| $n_{15}$ | S-BSL7 | dn/dt = 2.8 | $\epsilon = 0.434 \times 10^2$ |
| $n_{16}$ | S-BAL14 | dn/dt = 2.0 | $\epsilon = 0.264 \times 10^2$ |

In the tables shown above, the reference symbols $n_1$, $n_2$, . . . in the first column indicates correspondence to the lens elements having the refractive indices $n_1$, $n_2$, . . . names of glass materials offered by Ohara Co., Ltd. are listed in the second columns, temperature coefficients within a temperature range from 20° C. to 40° C. at a wavelength of 546.07 nm disclosed by a glass catalogue of Ohara Co., Ltd. are summarized in the third columns and perfocality correcting coefficients for a refractive index change of 1 at maximum magnifications are numerated in the fourth columns. In addition, values of dn/dt are listed as those at $10^{-6}/°$ C.

Each of the afocal zoom lens systems preferred as the embodiments is used in combination with the objective lens system 2, the imaging lens systems 4 and so on as shown in FIG. 4. The same objective lens system and the same imaging lens systems are used in these embodiments.

The objective lens system has numerical data which is described later and an internal inclination angle of θ=14.0°. Accordingly, a perfocality deviation amount allowable at a magnification of 9.2×which is a maximum in the embodiments described above, i.e., the right side of the condition (10), is 3.02 mm.

The first embodiment of the afocal zoom lens system for stereoscopic microscopes according to the present invention has a composition illustrated in FIG. 5, or is composed of a first positive lens unit ($r_1$ through $r_5$), a second negative lens unit ($r_6$ through $r_{10}$), a third positive lens unit ($r_{11}$ through $r_{15}$) and a fourth negative lens unit ($r_{16}$ through $r_{18}$): the first lens unit and the fourth lens unit being kept stationary during zooming, whereas the second lens unit and the third lens unit being moved as shown in (A), (B) and (C). Changes of variable airspaces $d_5$, $d_{10}$ and $d_{15}$ ($D_1$, $D_2$ and $D_3$) caused by the movements of the lens units are listed in the numerical data. In other words, these variable airspaces are changed as shown in (A), (B) and (C) at a minimum magnification (0.7×), an intermediate magnification (2.4×) and a maximum magnification (9.4×) by moving the second and third lens units.

The first lens unit is composed of a biconvex lens component, and a negative cemented lens component consisting of a positive lens element and a negative lens element in this order, the second lens unit is composed of a negative cemented lens component consisting of a negative lens element and a positive lens element in this order, and a biconcave lens component, the third lens unit is composed of a positive cemented lens component consisting of a negative lens element and a positive lens element in this order and a biconvex lens component, and the fourth lens unit is composed of a negative cemented lens component consisting of a negative lens element and a positive lens element in this order.

The reference symbols $r_{19}$ through $r_{23}$ represent an imaging lens system. In the numerical data, the reference symbols $r_{24}$ through $r_{27}$ designate the prisms shown in FIG. 4 and the reference symbol $r_{28}$ denotes a location of an intermediate image.

Each of the cemented lens components comprises a cemented lens component which consists of a positive lens element and a negative lens element as described above. Further, the first embodiment satisfies the conditions (1) through (7).

Further, the first embodiment allows perfocality deviation in an amount A listed in the numerical data which is determined as a value at the maximum magnification in an environment 20° C. higher than normal temperature of 20° C. As indicated by the numerical data, A has a value of 0.925 mm which is shorter than the above-mentioned allowable distance of 3.02 mm (value of the right side of the condition (10)), or within the allowable range.

Figure 6A:
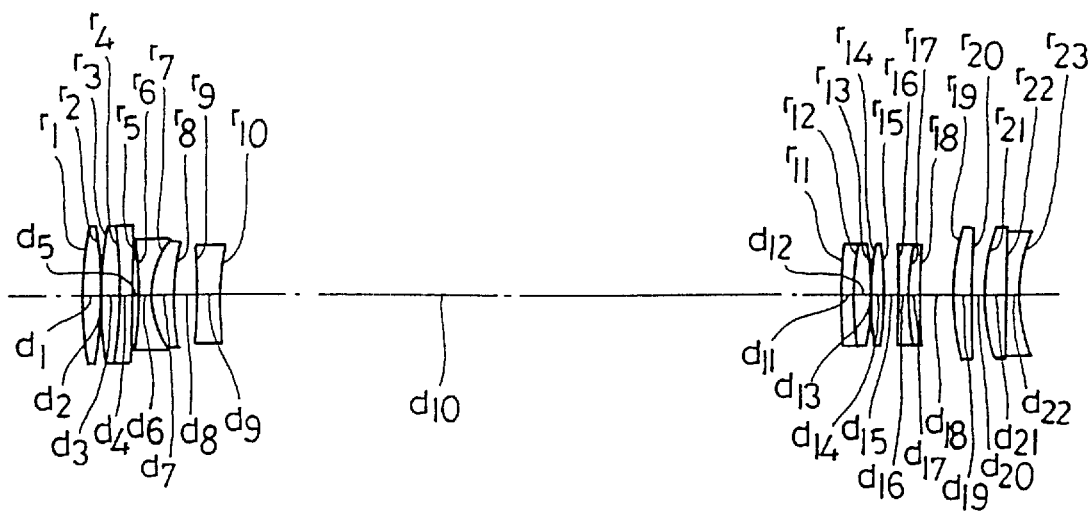
Figure 6B:
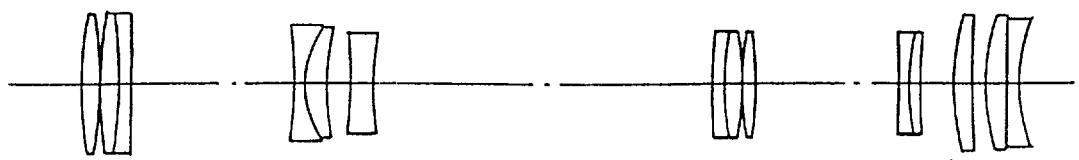
Figure 6C:
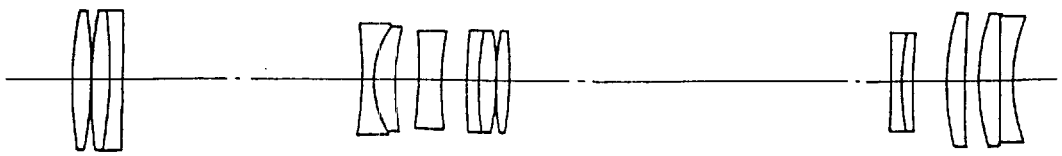

The second embodiment has a composition illustrated in FIG. 6, or similar to the first embodiment in a composition thereof and movements of lens units for zooming.

The second embodiment also satisfies the conditions (1) through (7) as clarified by the numerical data. Further, the second embodiment allows perfocality deviation in an amount A of 1.056 mm which is within the allowable range.

Figure 7A:
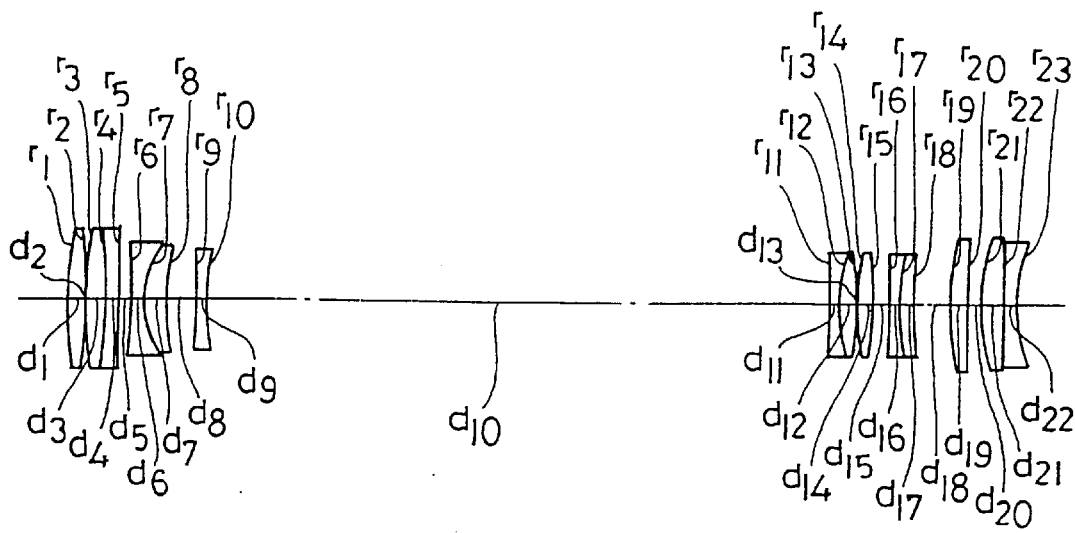
Figure 7B:
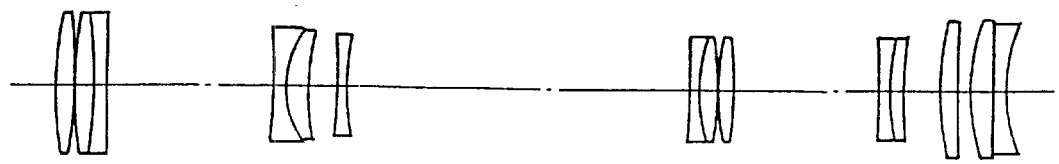
Figure 7C:
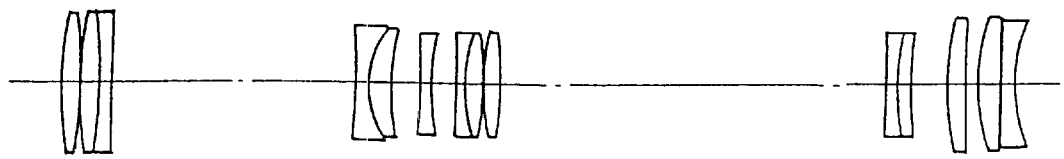

The third embodiment is configured as shown in FIG. 7, or has a composition which is same as that of the first or second embodiment, except for a negative cemented lens unit which is used in a third lens unit.

The third embodiment also satisfies the conditions (1) through (7) as apparent from the numerical data. The third embodiment has a perfocality deviation amount A of 2.478 mm which is within the allowable range.

Figure 8A:
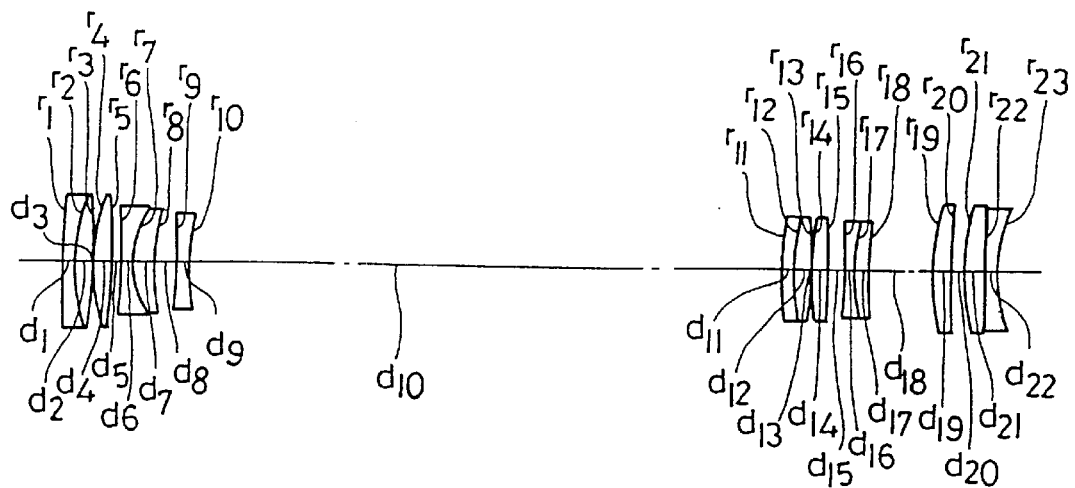
Figure 8B:
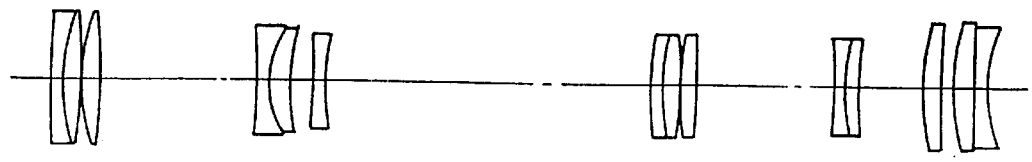
Figure 8C:
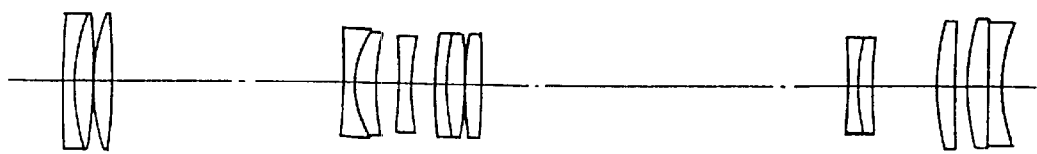

The fourth embodiment is configured as shown in FIG. 8, wherein a first lens unit is composed of a negative cemented lens component consisting of a negative lens element and a positive lens element in this order, and a biconvex lens component. The fourth embodiment uses a second lens unit, a third lens unit and a fourth lens unit having compositions which are the same as those of the first lens unit, the second lens unit and the third lens unit of the first embodiment. Further, the lens units are moved for zooming as in the first embodiment as shown in the drawing.

The fourth embodiment also satisfies the conditions (1) through (7). The fourth embodiment has a perfocality deviation amount A of 1.961 mm which is within the allowable range.

Figure 9A:
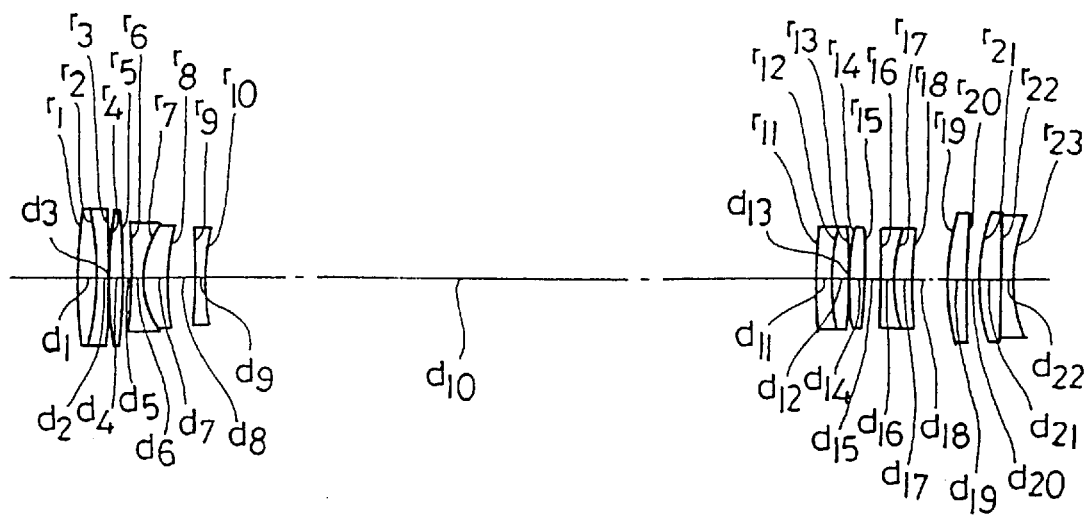
Figure 9B:
Figure 9C:
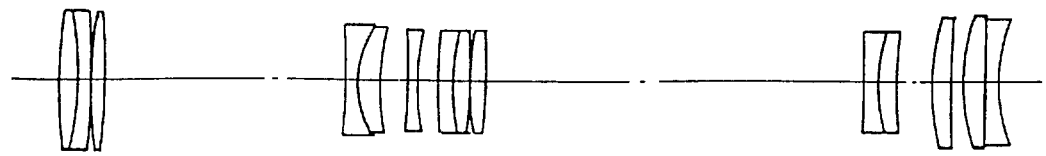

The fifth embodiment has a composition illustrated in FIG. 9. The fifth embodiment is different from any of the first through fourth embodiments in that it uses a first lens unit which is composed of a positive cemented lens component consisting of a positive lens element and a negative lens element in this order, and a biconvex lens component, a second lens unit which is composed of a negative cemented lens component consisting of a negative lens element and a positive lens element in this order and a biconcave lens component, a third lens unit which is composed of a positive cemented lens component consisting of a negative lens element and a positive lens element in this order, and a biconvex lens component, and a fourth lens unit which is composed of a negative cemented lens component consisting of a negative lens element and a positive lens element in this order.

The fifth embodiment also satisfies the conditions (1) through (7). A perfocality deviation amount A of the fifth embodiment is 0.846 mm which is within the allowable range.

Figure 10A:
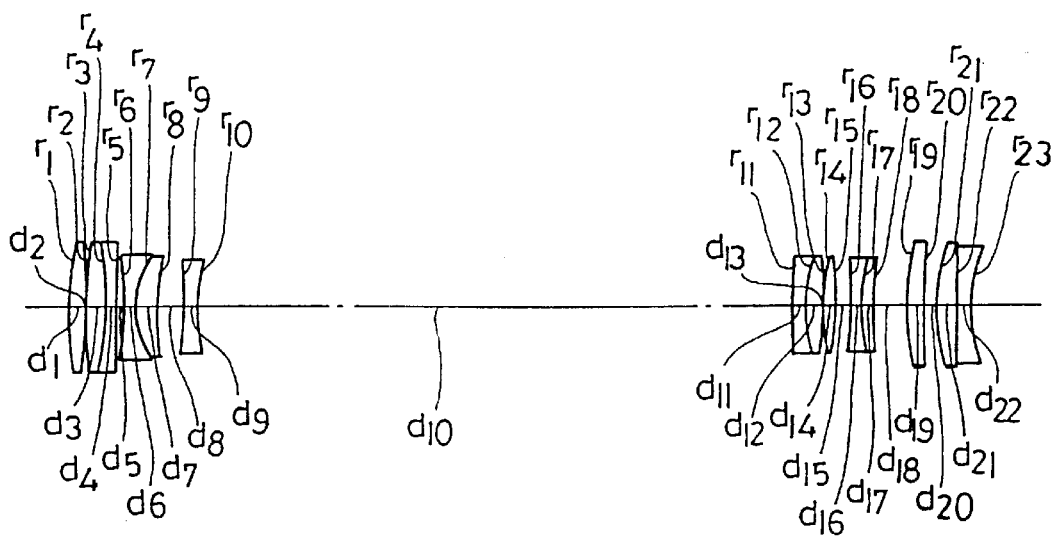
Figure 10B:
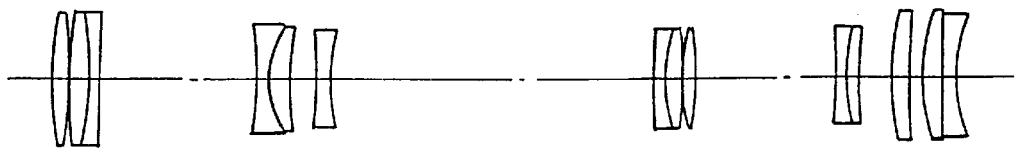
Figure 10C:
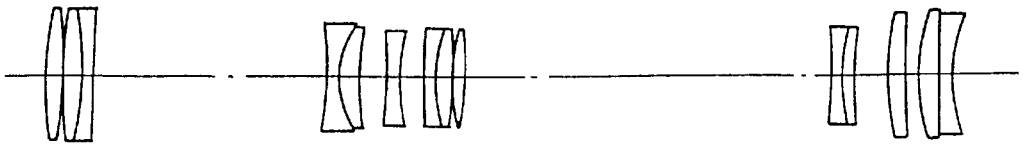

The sixth embodiment has a composition illustrated in FIG. 10, which is similar to that of the first embodiment.

The sixth embodiment also satisfies the conditions (1) through (7). Further, the sixth embodiment allows perfocality deviation in an amount A of 2.395 mm which is within the allowable range.

Figure 11A:
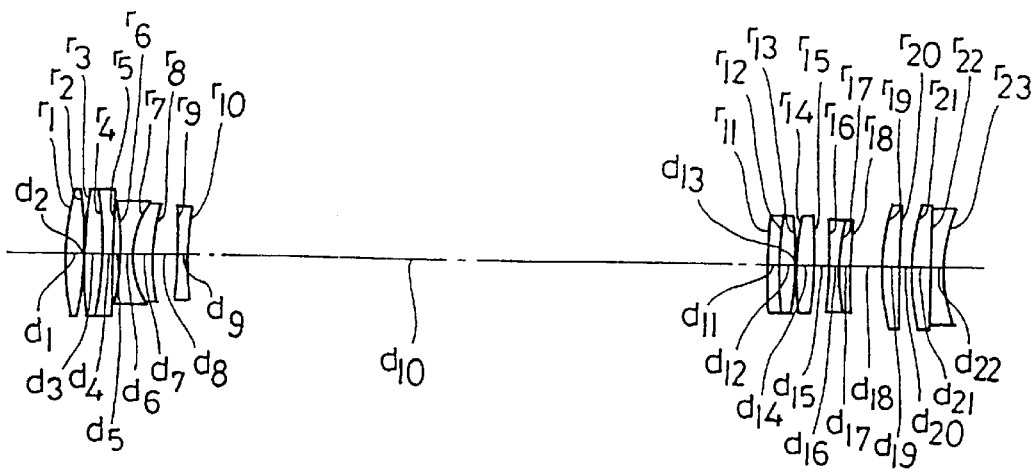
Figure 11B:
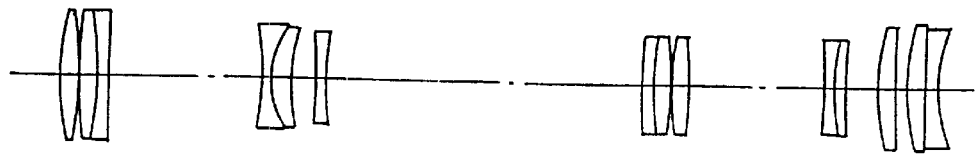
Figure 11C:
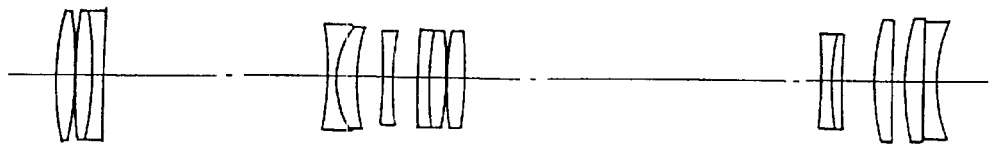

The seventh embodiment has a composition illustrated in FIG. 11(A–C), which is similar to that of the first embodiment.

The seventh embodiment also satisfies the conditions (1) through (7). Further, the seventh embodiment allows perfocality deviation in an amount A of 2.402 mm which is within the allowable range.

Each of the first through seventh embodiments is used in a condition where it is disposed on the image side of an objective lens system of a stereoscopic microscope as shown in FIG. 4.

The objective lens system shown in FIG. 4 has numerical data which is listed below:

```
   D₀ = 75.331
R₁ = 139.139
   D₁ = 8.67      N₁ = 1.64100     V₁ = 56.9
R₂ = −79.696
   D₂ = 1.25
R₃ = −63.420
   D₃ = 5.54      N₂ = 1.64450     V₂ = 40.8
R₄ = 51.128
   D₄ = 12.18     N₃ = 1.49799     V₃ = 81.6
R₅ = −121.073
   D₅ = 1.29
R₆ = 55.650
   D₆ = 21.47     N₄ = 1.65016     V₄ = 39.4
R₇ = −35.247
   D₇ = 5.52      N₅ = 1.64450     V₅ = 40.8
R₈ = 48.693
   D₈ = 3.93
R₉ = 161.881
   D₉ = 7.42      N₆ = 1.48749     V₆ = 70.2
R₁₀ = −94.076
   D₁₀ = 5.0
focal length = 90.0,  internal inclination angle = 14.0°
``` wherein the reference symbols $R_1, R_2, \ldots$ represent radii of curvature on surfaces of respective lens elements of the objective lens system, the reference symbols $D_1, D_2, \ldots$ designate thicknesses of the respective lens elements of the objective lens system and airspaces reserved therebetween, the reference symbols $N_1, N_2, \ldots$ denotes refractive indices of the respective lens elements, and the reference symbols $V_1, V_2, \ldots$ represent Abbe's numbers of the respective lens elements. Further, the reference symbol $D_0$ designates a working distance, and the reference symbol $D_{10}$ denotes an airspace reserved between the objective lens system and the afocal zoom lens systems. In addition, the imaging lens systems have numerical data listed in each of the embodiments.

The objective lens system and the imaging lens systems are used commonly to the embodiments.

The objective lens system has a focal length of 90.0 mm and an internal inclination angle of 14.0°, whereas the imaging lens system has a focal length of 210 mm, an emerging numerical aperture of 0.032 and an image height of 11.0 mm.

Each of the embodiment of the present invention has a maximum magnification of 9.2× and an internal inclination angle of 14.0°, and allows perfocality deviation in an amount of 3.02 mm as described above.

The afocal zoom lens system for stereoscopic microscopes according to the present invention has a zoom ratio as high as 13, exhibits favorable optical performance within a broad magnification range and corrects chromatic aberration extremely favorably at high magnifications in particular. Further, the afocal zoom lens system for stereoscopic microscopes according to the present invention suppresses a shift of a center of an optical axis for left or right eye due to a perfocality deviation caused by environmental changes within an allowable range, thereby facilitating stereoscopic observation of fine structures at high magnifications.

What is claimed is:

1. An focal zoom lens system comprising:
    a first lens unit comprising three or more lens elements, said three or more lens elements including a cemented lens component and a single lens element, said first lens unit having a positive refractive power as a whole;
    at least three lens units having a vari-focal function and a perfocal function;
    one or more positive lens element made of glass materials; and
    a negative lens element made of glass materials,
    said positive and negative lens elements having different temperature coefficients of relative refractive index so that a perfocality deviation amount produced by at least one lens unit counteracts a perfocality deviation amount produced by another lens unit.

2. An afocal zoom lens system for stereoscopic microscopes according to claim 1, wherein said second lens unit comprises at least a negative cemented lens component having one or more positive lens elements and a negative lens element, and satisfies the following condition (9):

$$|(dn/dt)_{G1}| < |(dn/dt)_{G2}| \qquad (9)$$

wherein a reference symbol (dn/dt) represents a temperature coefficient of said relative refractive index, a reference symbol $|(dn/dt)_{G1}|$ designates a temperature coefficient of the relative refractive index of a positive lens element of said first lens unit, said positive lens element having a largest negative value out of the one or more positive lens elements of said first lens unit and a reference symbol $|(dn/dt)_{G2}|$ denotes a temperature coefficient of the relative refractive index of said positive lens element of the negative cemented lens component of said second lens unit, said positive lens element having a largest value of the one or more positive lens elements of the negative cemented lens component disposed in said second lens unit.

3. An afocal zoom lens system according to claim 1, wherein said at least one lens unit is the first lens unit and said another lens unit is a second lens unit.

4. An afocal zoom lens system having a zoom ratio of 9 or higher and comprises a plurality of lens units, wherein said afocal zoom lens system is configured so that a perfocality deviation amount produced by at least one lens unit due to a temperature change counteracts a perfocality deviation amount produced by another lens unit.

5. An afocal zoom lens system according to claim 4, wherein said afocal zoom lens system comprises at least a first lens unit and a second lens unit in order from the object side, and wherein said afocal zoom lens system is configured so that a perfocality deviation amount produced by said second lens unit due to a temperature change counteracts a perfocality deviation amount produced by said first lens unit due to a temperature change.

6. An afocal zoom lens system according to claim 1 or 4, wherein said afocal zoom lens system is coupled to a stereoscopic microscope configured to observe an object, said stereoscopic microscope having left and right eyepieces configured to form optical axes to said object, wherein a perfocality deviation amount A produced in a temperature environment of normal temperature of 20° C.±20° C. satisfies the following condition (10):

$$|A| < (8/100) \times (\beta/2 \times \sin(\theta/2)) \qquad (10)$$

wherein the references symbol θ represents an internal inclination angle of a stereoscopic microscope, said internal inclination angle being measured relative to a surface of the object from which a center position of the optical axis formed by the left eyepiece and a center position of the optical axis formed by the right eyepiece are deviated from one another and a reference symbol β designates a magnification of a lens system composed of an objective lens, the afocal zoom lens system, an imaging lens and an intermediate image.

7. A stereoscopic microscope having an afocal zoom lens system mounted thereto, said afocal zoom lens system comprising:
    a first lens unit comprising three or more lens elements, said three or more lens elements including a cemented lens component and a single lens element, and said first lens unit having a positive refractive power as a whole;
    at least three lens units having a vari-focal function and a perfocal function;
    one or more positive lens element made of glass materials; and
    a negative lens element made of glass materials,
    said positive and negative lens elements having different temperature coefficient; of relative refractive index so that a perfocality deviation amount produced by at least one lens unit counteracts a perfocality deviation amount produced by another lens unit.
    wherein said afocal zoom lens system comprises a positive lens element and a negative lens element made of glass materials, said positive and negative lens elements having different temperature coefficients of relative refractive index so that a perfocality deviation amount produced by at least a lens unit counteracts a perfocality deviation amount produced by another lens unit.

* * * * *